United States Patent
Giles et al.

(10) Patent No.: US 12,105,865 B2
(45) Date of Patent: Oct. 1, 2024

(54) USER MOVEMENT DETECTION FOR VERIFYING TRUST BETWEEN COMPUTING DEVICES

(71) Applicant: Google LLC, Mountain View, CA (US)

(72) Inventors: Daniel Lee Giles, Fremont, CA (US); Gerard Pallipuram, Cupertino, CA (US); Nicha Ratana, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/772,305

(22) PCT Filed: Aug. 16, 2019

(86) PCT No.: PCT/US2019/046744
§ 371 (c)(1),
(2) Date: Jun. 12, 2020

(87) PCT Pub. No.: WO2021/034299
PCT Pub. Date: Feb. 25, 2021

(65) Prior Publication Data
US 2023/0100854 A1    Mar. 30, 2023

(51) Int. Cl.
*G06F 3/01* (2006.01)

(52) U.S. Cl.
CPC .................. *G06F 3/011* (2013.01)

(58) Field of Classification Search
None
See application file for complete search history.

(56) References Cited

U.S. PATENT DOCUMENTS

| | | | |
|---|---|---|---|
| 8,769,624 B2 | 7/2014 | Cotterill | |
| 9,002,322 B2 | 4/2015 | Cotterill | |
| 9,763,098 B2 | 9/2017 | Schushan | |
| 10,318,005 B2 | 6/2019 | Gong et al. | |
| 2009/0041313 A1 | 2/2009 | Brown | |

(Continued)

FOREIGN PATENT DOCUMENTS

| | | |
|---|---|---|
| EP | 2851001 | 3/2015 |
| EP | 3067777 | 9/2016 |

OTHER PUBLICATIONS

International Search Report and Written Opinion for PCT/US2019/046744, mailed on Apr. 21, 2020, 13 pages.

(Continued)

*Primary Examiner* — Parul H Gupta
(74) *Attorney, Agent, or Firm* — DORITY & MANNING P.A.

(57) ABSTRACT

Systems and methods for managing interactive object input are disclosed. An interactive object can include sensors configured to generate sensor data indicative of movement associated with a user of the interactive object. Movement data can be analyzed to detect an attachment of a user to the interactive object and/or a separation of a user from the interactive object. State data indicative of a state of the interactive object relative to the user device can be generated in response detecting a separation of a user from the interactive object. The user device can be disabled, based on the state data, from initiating one or more functions in response to input received at the interactive object.

18 Claims, 13 Drawing Sheets

(56) References Cited

U.S. PATENT DOCUMENTS

| | | | |
|---|---|---|---|
| 2012/0032903 A1* | 2/2012 | Yamamoto | G06F 1/1626 |
| | | | 345/173 |
| 2014/0380465 A1 | 12/2014 | Fadell et al. | |
| 2016/0042170 A1 | 2/2016 | Farraro | |
| 2016/0162256 A1* | 6/2016 | Komaromi | H04Q 9/00 |
| | | | 340/870.07 |
| 2016/0245665 A1* | 8/2016 | Logan | G06K 19/027 |
| 2016/0267771 A1* | 9/2016 | Baek | H04M 1/72412 |
| 2016/0283101 A1 | 9/2016 | Schwesig et al. | |
| 2016/0306955 A1* | 10/2016 | Martin | G06F 21/34 |
| 2017/0060298 A1* | 3/2017 | Hwang | A61B 5/6807 |
| 2018/0144232 A1 | 5/2018 | DeBates et al. | |
| 2018/0307315 A1 | 10/2018 | Gong et al. | |
| 2019/0388728 A1* | 12/2019 | Wang | G06F 18/2113 |

OTHER PUBLICATIONS

Machine Translated Chinese Search Report Corresponding to Application No. 2019800073075 on Nov. 8, 2023.

* cited by examiner

USER MOVEMENT DETECTION FOR VERIFYING TRUST BETWEEN COMPUTING DEVICES

This application is based upon and claims the right of priority under 35 U.S.C. § 371 to International Application No. PCT/US2019/046744, filed Aug. 16, 2019, which is incorporated by reference herein by reference in its entirety.

FIELD

The present disclosure relates generally to interactive objects communicatively coupled to computing devices.

BACKGROUND

The integrated use of multiple computing devices by users has become a common feature of many modern computing environments. For example, users may utilize a smartwatch or other interactive object in conjunction with a smart phone to perform device functions such as sending and receiving messages, listening to audio, and the like. Utilizing multiple computing devices in an integrated manner may provide many benefits to a user of the computing devices. For example, a smaller interactive object such as a smartwatch may enable the user to more conveniently access data provided by a larger device such as a smart phone or by cloud computing systems. Similarly, a smaller interactive object enables a user to provide many inputs without having to access a larger computing device. While the integrated use of multiple computing devices may provide many benefits, managing inputs provided at an interactive object for controlling a second computing device can present challenges. For instance, a user may provide authentication data at one or both computing devices to enable communication between the community devices. Such authentication measures may provide a less than desirable user experience.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of managing interactive object input. The method includes enabling, by one or more processors, a computing device to initiate one or more functions in response to input received from an interactive object that is remote from the computing device, and obtaining, by the one or more processors, movement data indicative of movement associated with a user of the interactive object. The movement is detected by one or more sensors of the interactive object. The method includes determining, by the one or more processors, that the movement data is indicative of one or more predefined motions associated with a separation of the user from the interactive object, and in response to the movement data being indicative of the one or more predefined motions, disabling, by the one or more processors, the computing device from initiating the one or more functions in response to input received from the interactive object.

Another example aspect of the present disclosure is directed to an interactive object, including one or more sensors configured to detect movement associated with a user of the interactive object, and one or more processors communicatively coupled to the one or more sensors. The one or more processors are configured to obtain movement data indicative of movement associated with a user of the interactive object. The movement is detected by the one or more sensors. The one or more processors are configured to determine that the movement data is indicative of one or more predefined motions associated with a separation of the user from the interactive object, and transmit, to the computing device, data indicative of the separation of the user from the interactive object.

Another example aspect of the present disclosure is directed to a computing system, including one or more processors and one or more non-transitory, computer-readable media that store instructions that when executed by the one or more processors cause the computing system to perform operations. The operations include enabling a first computing device to initiate one or more functions in response to input received from an interactive object that is remote from the first computing device, and receiving, from the interactive object, data associated with a user separation from the interactive object. The data associated with the user separation is based at least in part on movement of a user of the interactive object and the movement is detected by one or more sensors of the interactive object. The operations include disabling, in response to the data associated with the user separation, the first computing device from initiating one or more functions in response to input received from the interactive object.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for communicating with a touch sensor or other type of sensor.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
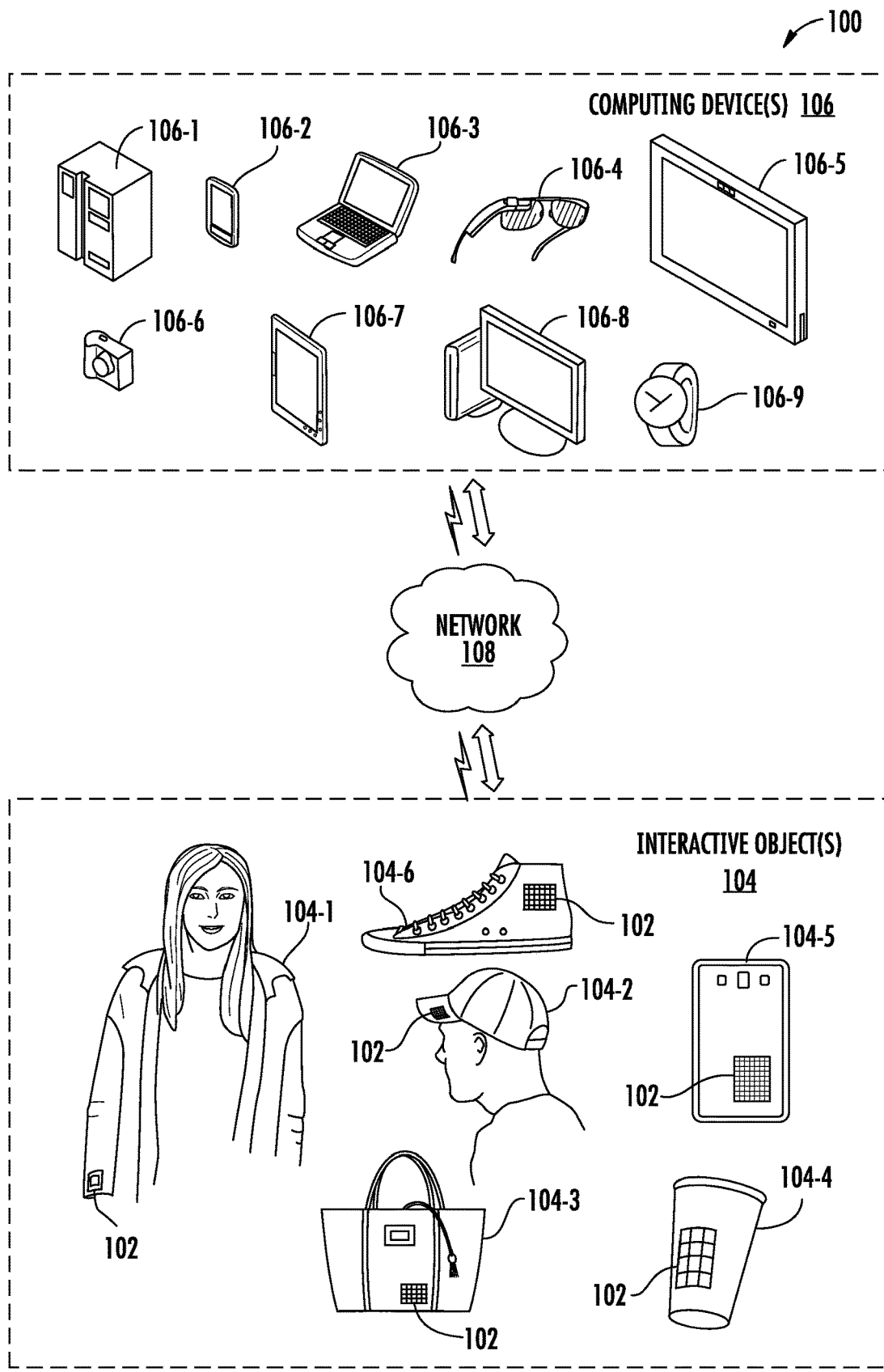
FIG. 1 depicts a block diagram of an example computing environment including an interactive object in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to managing the execution of functionality at a computing device based on user input provided at an interactive object communicatively coupled to the computing device. More particularly, the present disclosure is directed to disabling and/or enabling functionality at a computing device remote from an interactive object in response to the detection of one or more predefined motions indicative of a disassociation and/or association between the interactive object and a user of the interactive object. For example, movement data indicative of movement associated with a user of an interactive object can be detected by one or more sensors of the interactive object. The movement data can be analyzed to determine whether it is indicative of one or more predefined motions associated with a user separation from the interactive object. If the movement data indicates that the user has become separated from the interactive object, the computing device can be disabled from initiating one or more functions in response to inputs received at the interactive object. For example, the computing device may store state data indicative of a non-trusted state of the interactive object relative to the computing device. Based on the state data, the computing device can be disabled from initiating one or more functions in response to signals received from the interactive object. In some examples, the state data can be stored in addition to other data associated with the interactive object, such as authentication or other data identifying the interactive object.

In accordance with example implementations, an interactive object can include one or more sensors such as a touch sensor and/or an inertial measurement sensor. The sensor(s) can detect movement associated with the user of the interactive object and generate sensor data in response to the detected movements. For example, the sensor(s) can generate sensor data including touch-input data, inertial data, etc. in response to movement of the interactive object and/or user relative to the interactive object. Movement data, including the sensor data and/or data derived from the sensor data, can be analyzed to detect a detachment or other dissociation of the user from the interactive object. By way of example, an interactive garment can be configured to receive touch input at a touch sensor or to detect user movement via an inertial measurement sensor.

The sensors can generate sensor data in response to movements including a user removing an interactive object. The sensor data can be analyzed to detect one or more predefined motions indicative of removal of an interactive object from the user's body, for example. In response to determining that the user has become separated from an interactive object, such as by detecting that the user is no longer wearing an interactive garment, the remote computing device can be configured such that some or all inputs from the interactive garment are no longer acted upon. For example, the remote computing device can be disabled from initiating functions in response to inputs received at the interactive object.

According to some examples, movement data can be analyzed to detect an attachment or other association of a user with an interactive object. In response to determining that a user has become attached or otherwise associated with an interactive garment, such as by detecting that a user has put an interactive garment on their body, a remote computing device can determine that inputs from the interactive garment should be acted upon. For example, the remote computing device can be enabled to initiate functions in response to inputs received at the interactive object. In accordance with some embodiments, additional authentication measures can be utilized in conjunction with a detection of a user separation and/or user attachment in order to generate state data associated with the interactive object.

Additionally, in some implementations, movement data associated with continued attachment between a user and an interactive object can be utilized to continue enablement of functions to be performed at the remote computing device in response to inputs at the interactive object. For example, state data indicative of a trusted state can be maintained based on movement data indicative of a predefined motion associated with continued user attachment to the interactive object. An interactive object may periodically transmit data such as a sensor data or an indication of a detected motion to the remote computing device, or the remote computing device may periodically request movement data and/or other data from the interactive object. In response to detecting one or more predefined motions indicative of a user movement and/or a user attachment with the interactive object, state data indicative of a trusted state can be generated and/or maintained. In this manner, movement data may be utilized to maintain state data indicative of a trusted state by a remote computing device.

According to example implementations, a first set of predefined motions can be indicative of a separation of a user from an interactive object. For instance, one or more first predefined motions can include movements by a user or an interactive object that are associated with a disassociation (e.g., removal, separation, increased distance, etc.) of the user from the interactive object. For example, the first set of predefined motions can include movements by a user or interactive object that are associated with removing a wearable interactive object. Such motions may correspond to unzipping a jacket, unclipping a watch, removing a hat, removing a purse from one's shoulder, placing a backpack or other object on the ground, etc. In some examples, a predefined motion may include movements associated with an interactive object while the interactive object is separated from the user of the interactive object. For instance, a motion associated with a user removing an interactive object may comprise movement associated with removing the interactive object then the interactive object remaining stationary for a minimum period of time.

In some examples, a second set of predefined motions may be indicative of an attachment or other association of a user with an interactive object. The second predefined motions can include movements by a user or an interactive object that correspond to an association (e.g., putting on, wearing, decreasing a distance, etc.) of the user with the interactive object. For example, the second set predefined motions can include movements by a user or interactive object that are associated with putting on or attaching a wearable interactive object. Such motions may correspond to zipping a jacket or other garment, clipping on a watch, placing a hat on one's head, placing a purse on one's shoulder, picking up a backpack or other object from the ground, etc. The second predefined motions may be associated with a close or decreasing physical proximity between the interactive object and a user. In some examples, the second predefined motions can include wearing a wearable interactive object. By way of example, a second predefined motion can be associated with a sliding movement of a jacket sleeve, the swinging movement of a purse and/or watch, etc., while a user is wearing the interactive object.

As a specific example, an interactive object in accordance with some example embodiments can include a touch sensor comprising one or more sensing lines such as conductive threads. A touch input to the touch sensor can be detected by the one or more sensing lines using sensing circuitry connected to the one or more conductive lines. The sensing circuitry can generate sensor data based on the touch input. The touch input sensor data can be analyzed to detect predetermined motions associated with movements such as a user's arm moving through a sleeve as an interactive garment is put on or removed. As another example, an interactive object can include an inertial measurement unit configured to generate sensor data indicative of acceleration, velocity, and other movements. The sensor data can be analyzed to detect or recognize predetermined motions associated with movements such as a user picking up, putting down, attaching, or detaching an interactive object.

In accordance with example embodiments, state data indicative of a state (e.g., trusted state, non-trusted state, etc.) of an interactive object relative to a remote computing device can be generated based on the detection of movement associated with a user separation from or attachment to the interactive object. State data indicative of a non-trusted state of the interactive object relative to the remote computing device can be generated in response to detecting a separation of the user from the interactive object. For example, state data indicative of a non-trusted state of the interactive object relative to the remote computing device can be generated based on detecting a pre-defined gesture associated with user separation from the interactive object. In turn, the remote computing device can be configured for non-performance of one or more actions in response to input from the interactive object. For instance, the remote computing device can be disabled, in response to the state data indicative of the non-trusted state, from initiating one or more functions in response to input from the interactive object. By way of example, the computing device can be a smartphone carried by the user and the interactive object may be a wearable garment that when not separated is worn by the user and when separated has been taken off by the user. Disabling the smartphone can include preventing sensor-sensed inputs from causing the smartphone to perform any function responsive thereto. In some examples, the wearable garment can otherwise remain authenticated to the smartphone. In other examples, the wearable garment can be de-authenticated from the phone.

According to some implementations, state data indicative of a trusted state of the interactive object relative to the remote computing device can be generated at least partially in response to detecting an attachment of the user to the interactive object. A remote computing device and/or an interactive object can initiate an authentication process in response to detecting a user attachment to the interactive object. In some examples, additional authentication information may be provided by a user to establish a trusted state between the interactive object and the remote computing device. For example, the authentication data can include a pin code(s), password(s), security question(s), gesture(s), etc. or other data to uniquely identify a user, the remote computing device, and/or the interactive object. In some implementations, the authentication data can be generated in response to input from a user at the remote computing device. Additionally or alternatively, authentication data may be generated in response to input received via the interactive object. The authentication data can be different from the movement data and state data.

A remote computing device can utilize state data indicative of a trusted state for an interactive object to enable the computing device to initiate functions in response to signals received from the interactive object. The remote computing device, in response to state data indicative of a trusted state, may initiate one or more functions without requiring additional authentication of the interactive object. For example, the remote computing device may receive signals from the interactive object and initiate functions associated with the signals in response to state data indicative of the trusted state. The interactive object can thus interact with the remote computing device without requiring separate authentication at the user device. In this manner, the trusted state at the user device may save computing resources by eliminating redundant security authentication measures.

In some examples, movement data generated by an interactive object can be input into one or more machine-learned models (e.g., a machine-learned classification model) to detect one or more predefined motions. The one or more predefined motions can be indicative of at least one of the attachment of the user to the interactive object and/or the separation of the user from the interactive object. State data indicative of a state (e.g., trusted state, non-trusted state, etc.) of the interactive object relative to a remote computing device can be generated based on the output of the one or more machine-learned models. For example, state data indicative of a non-trusted state of the interactive object relative to the remote computing device can be generated in response to detecting the separation of the user from the interactive object. In turn, the remote computing device can be configured not to perform one or more actions in response to input from the interactive object. For instance, the remote computing device can be disabled, in response to the state data indicative of the non-trusted state, from initiating one or more functions in response to input from the interactive object.

A machine-learned classification model can include one or more neural networks (e.g., deep neural networks, convolutional neural networks) or other multi-layer non-linear models. The model(s) can be trained, via one or more machine learning techniques, using training data. The training data can include movement data previously collected by one or more interactive objects. By way of example, one or more interactive objects can generate movement data based on one or more movements associated with a user of the one or more interactive objects. The training data can be labeled to identify a particular movement corresponding to the movement data. The machine-learned classification model can be trained using various training or learning techniques, such as, for example, backwards propagation of errors based on the labeled training data.

In this manner, the machine-learned classification model can be trained to detect particular movements associated with a user of the interactive object based on movement data. In some implementations, movement data can be input into the machine-learned classification model. A separation of a user from the interactive object can be detected based at least in part on output data indicative of the one or more predefined motions. For example, a plurality of predefined motions can correspond to a separation of a user from the interactive object. In this manner, data indicative of the one or more predefined motions can be used to identify a separation of the user from the interactive object. Similarly, a machine learned classification model can be trained to detect particular movements associated with a user attachment to an interactive object. In such examples, the machine learned classification model can generate data indicative of a predefined motions associated with a user attachment to an interactive object.

In some examples, a machine-learned classification model can be configured to output an inference of a separation of a user from the interactive object and/or an inference of an attachment of a user to the interactive object based, at least in part, on movement data. For example, a machine-learned classification model can be trained to detect a separation of a user from the interactive object based on input movement data. In this manner, the movement data can be input into the machine-learned classification model which can output an inference of a separation of a user from the interactive object. By way of example, the machine-learned classification model can include a machine-learned binary classifier model. The model can classify the movement data in a binary manner, such as to indicate whether the movement data is indicative of a separation of a user from the interactive object (e.g., "1") or not indicative of a separation (e.g., "0"). Similarly, a machine learned classification model can include a machine learned binary classifier model that can classify movement data as indicative of an attachment of a user to an interactive object (e.g., "1") or as not indicative of an attachment (e.g., "0").

In some examples, a motion manager can be implemented at one or more of the computing devices in a computing environment including an interactive object. The motion manager, also referred to as a gesture manager, can be configured, in some implementations, to at least partially facilitate management of interactive object input to a remote computing device. The motion manager can be configured to initiate one or more actions in response to detecting a predefined motion or recognizing a user movement. For example, the motion manager can be configured to provide data indicative of the detected motion or user movement to other applications at a computing device. The motion manager can be implemented at one or more computing devices of the interactive object and/or at one or more remote computing devices. A motion or gesture can be determined based on touch data detected by a touch sensor, an inertial measurement unit, and/or other sensor. For example, a motion manager can determine a motion based on touch data, such as an unintentional input to a touch sensor as a user removes an interactive garment, or based on inertial data such as velocity, acceleration, or other data as may be generated by an inertial measurement sensor as a user removes an interactive garment. The motion manager can access data defining the predefined motion or gesture. In some examples, a motion manager may communicate movement data such as sensor data and/or data derived from sensor data to a remote computing device. For instance, a motion manager may determine that a predetermined motion associated with a user removal of an interactive garment has been detected and in response transmit an indication of such detection to the remote computing device. The motion manager can, for example, disable the remote computing device from initiating one or more functions by transmitting to the remote computing device data indicative of the separation of the user from the interactive object. In another example, the motion manager can be implemented at least partially at the remote computing device and can disable, by the computing device from initiating one or more functions by storing at the computing device state data indicative of the separation of the user from the interactive object.

Embodiments of the disclosed technology provide a number of technical effects and benefits, particularly in the areas of computing technology, interactive objects, and the integration of the two. In particular, embodiments of the disclosed technology provide improved techniques for managing interactive object input. For example, utilizing embodiments of the disclosed technology, computing devices can be disabled from initiating functions in response to inputs provided at an interactive object based on a detected separation of a user from the interactive object. In some examples, a user authentication process can be initiated in response to detecting a separation of a user from an interactive object. The authentication process can include determining if movement data is indicative of a user attachment with the interactive object in addition to determining user authentication data such as a password or pin. In some examples, sensor data is analyzed to detect movements associated with user separation from an interactive object. For example, the sensor data can be input into a machine-learned model to detect whether a user is attached or separated from an interactive object. Such techniques can enable an automatic disablement of functionality at the remote computing device when a detachment is detected, in this manner, improved security of inputs received from interactive objects can be provided. In some examples, the object can remain authenticated with a computing device, even when a non-trusted state is determined for the interactive object.

In some examples, existing sensor data, such as may be generated by unintentional inputs to touch sensors and normal user movements can be used to disable and/or enable a remote computing device for responding to inputs at an interactive object. In some examples, such techniques may conserve computing resources by accessing existing sensor data in a unique and effective way to utilize the data to increase security and convenience of using interactive objects with connected computing devices.

Example aspects of the disclosed technology provide an improvement to interactive computing technology including interactive objects communicatively linked to one or more computing devices. In response to detecting a separation of a user from an interactive object, data indicative of a state of the interactive object can be modified. State data indicative of a non-trusted state can be used to disable functionality at a remote computing device. In some examples, state data indicative of a non-trusted state can be used to initiate a user authentication in response to inputs at the interactive object. In this manner, existing sensor data can be utilized to provide practical, technical improvements over previous interactive computing systems. For instance, the disclosed technology can detect and analyze sensor data typically ignored by previous interactive computing systems, such as sensor data indicative of unintentional inputs and/or everyday movements associated with a user of an interactive object. In some examples, the disclosed technology can be used to protect against unauthorized use of computing devices. In this manner, the present disclosure enables more nuanced and flexible security measures for connecting an interactive object to a user device. The disclosed technology thus allows computing systems to accumulate and utilize information to provide enhanced security measures unique to interactive computing technology.

With reference now to the figures, example aspects of the present disclosure will be discussed in greater detail, FIG. 1 is an illustration of an example computing environment 100 including an interactive object associated with one or more computing devices in accordance with example embodiments of the present disclosure. Computing environment 100 includes various interactive objects 104 which can include a touch sensor 102 (e.g., capacitive or resistive touch sensor or other sensor. Touch sensor 102 can be integrated as an interactive textile or other flexible interactive material that is configured to sense touch-input (e.g., multi-touch input). As described herein, a textile may include any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner.

In computing environment 100, interactive objects 104 include "flexible" objects, such as a shirt 104-1, a hat 104-2, a handbag 104-3 and a shoe 104-6. It is to be noted, however, that touch sensor 102 may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Touch sensor 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Touch sensor 102 may be integrated within hard objects 104 using a variety of different manufacturing processes. In one or more implementations, injection molding is used to integrate capacitive touch sensors into hard objects 104.

Touch sensor 102 enables a user to control an object 104 with which the touch sensor 102 is integrated, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 may be a local computing device, such as a computing device that can be accessed over a Bluetooth connection, near-field communication connection, or other local-network connection. Computing device 106 may be a remote computing device, such as a computing device of a cloud computing system.

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Touch sensor 102 can interact with user devices 106 by transmitting touch-input data, inertial data, or other sensor data through network 108. Additionally, or alternatively, touch sensor 102 may transmit gesture data, movement data, or other data derived from sensor data generated by the touch sensor 102. Computing device 106 can use the touch-input data to control computing device 106 or applications at computing device 106. As an example, consider that touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by touch sensor 102.

Figure 2:
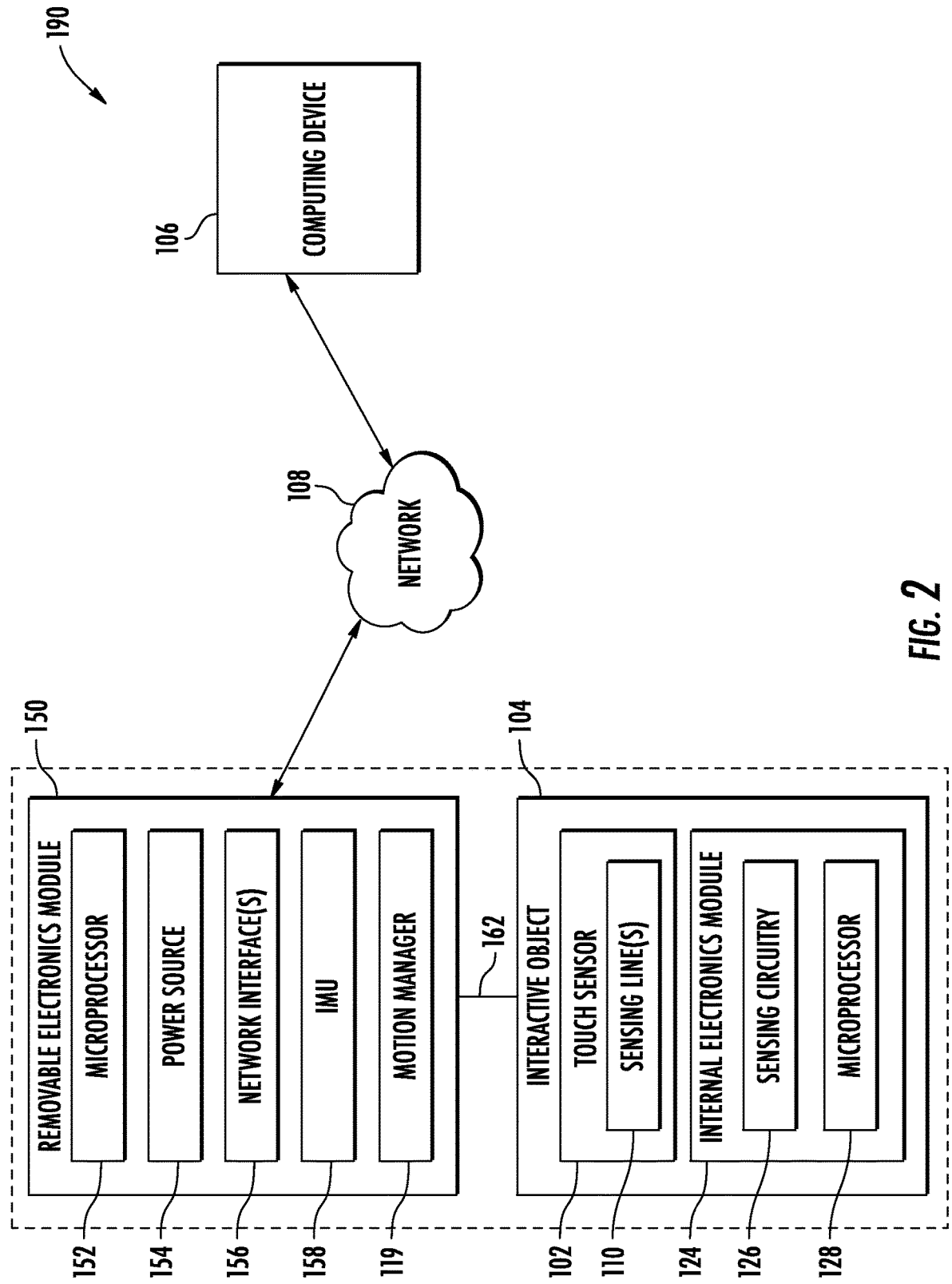
FIG. 2 depicts a block diagram of an example computing environment that includes an interactive object in accordance with example embodiments of the present disclosure.

In more detail, consider FIG. 2 which illustrates an example computing environment 190 that includes an interactive object 104, a removable electronics module 150, a computing device 106, and a remote computing device 180. In computing environment 190, touch sensor 102 is integrated in an object 104, which may be implemented as a flexible object (e.g., shirt 104-1, hat 104-2, or handbag 104-3) or a hard object (e.g., plastic cup 104-4 or smart phone casing 104-5).

Touch sensor 102 is configured to sense touch input from a user when the user interacts with the touch sensor 102 by, for example, moving one or more fingers across the touch sensor 102 or otherwise touching or coming within proximity of the touch sensor 102. Touch sensor 102 may be configured to sense single-touch, multi-touch, full-hand touch, or body movement touch input from a user. To enable the detection of touch input, touch sensor 102 includes sensing lines 110, which can be formed as a grid, array, or parallel pattern so as to detect touch input. In some implementations, the sensing lines 110 do not alter the flexibility of touch sensor 102, which enables touch sensor 102 to be easily integrated within interactive objects 104. Sensing lines 110 can be flexible, conductive sensing lines. A touch sensor can be formed from any suitable conductive material and in other manners, such as by using flexible conductive lines including metal lines, filaments, etc. attached to a non-woven substrate.

Interactive object 104 includes an internal electronics module 124 that is embedded within interactive object 104 and is directly coupled to sensing lines 110, internal electronics module 124 can be communicatively coupled to a removable electronics module 150 via a communication interface 162. Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104.

In computing environment 190, the electronic components contained within the internal electronics module 124 include sensing circuitry 126 that is coupled to sensing lines 110 that form the touch sensor 102. The sensing lines can be a set of conductive lines formed from a multilayered film, a set of conductive threads, or any other suitable conductive line. The sensing lines 110 can be directly attached to the sensing circuitry or can be attached to the sending circuitry via one or more connector components. In some examples, the internal electronics module comprises a flexible printed circuit board (PCB). The printed circuit board can include a set of contact pads for attaching to the sensing lines 110. In some examples, the printed circuit board includes a microprocessor 128. For example, wires from sensing lines 110 may be connected to sensing circuitry 126 using flexible PCB, creping, gluing with conductive glue, soldering, and so forth. In one embodiment, the sensing circuitry 126 can be configured to detect a user-inputted touch input on the sensing lines 110 that is pre-programmed to indicate a certain request. The internal electronics module can provide power and/or control signals to the plurality of sensing lines. The internal electronics module may not include an on-board power source in some embodiments. Instead, a removable electronics module removably coupled via a receptacle of the pre-fabricated sensor assembly can supply power to the internal electronics module.

In one embodiment, when the conductive threads form a grid or other pattern, sensing circuitry 126 can be configured to determine the location of the touch input on sensing line 110, as well as motion of the touch input. For example, when an object, such as a user's finger, touches sensing line 110, the position of the touch can be determined by sensing circuitry 126 by detecting a change in capacitance on a grid, array, or other pattern (e.g., parallel) of sensing lines 110. The touch input may then be used to generate touch-input data usable to control a computing device 106. For example, the touch input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

In some implementations, the sensing circuitry 126 can be configured to detect touch input indicative of movement associated with a user of the interactive object 104. For example, sensing circuitry 126 can be configured to detect touch input as a user engages in one or more motions with the interactive object 104. To do so, the sensing circuitry 126 can detect a change in capacitance or resistance of one or more sensing lines 110 as the user engages in one or more motions. For instance, the sensing circuitry 126 can be configured to detect touch input as the user separates from an interactive object 104. In addition, or alternatively, the sensing circuitry 126 can be configured to detect touch input as the user attaches to, or otherwise moves with, an interactive object 104. By way of example, the sensing circuitry 126 can detect touch input as a user puts on, wears, or takes off an interactive object 104.

Communication interface 162 enables the transfer of power and data between the internal electronics module 124 and the removable electronics module 150. In some implementations, communication interface 162 may be implemented as a connector that includes a connector plug and a connector receptacle. The connector plug may be implemented at the removable electronics module 150 and configured to connect to the connector receptacle, which may be implemented at the interactive object 104.

In computing environment 190, the removable electronics module 150 includes a microprocessor 152, power source 154, network interface(s) 156, and inertial measurement unit 158. Power source 154 may be coupled, via communication interface 162, to sensing circuitry 126 to provide power to sensing circuitry 126 to enable the detection of touch input. Power source 154, for example, can be implemented as a small battery. In some implementations, communication interface 162 is implemented as a connector that is configured to connect removable electronics module 150 to internal electronics module 124 of interactive object 104. When touch input is detected by sensing circuitry 126 of the internal electronics module 124, data representative of the touch input may be communicated, via communication interface 162, to microprocessor 152 of the removable electronics module 150. For example, the touch-input data can represent one or more motions of a user relative to the interactive object 104. Microprocessor 152 may then transmit the touch-input data and/or analyze the touch-input data to generate one or more control signals, which may then be communicated to computing device 106 (e.g., a smart phone) via the network interface 156 to cause the computing device 106 to initiate a particular functionality. Generally, network interfaces 156 are configured to communicate data, such as touch-input data, over wired, wireless, or optical networks to user devices 106. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108).

The interactive object 104 can include one or more inertial measurement unit(s) (IMU(s)) 158. The IMU 158 may be secured to the removable electronics module 150, for example, with zero degrees of freedom, either removably or irremovably, such that the inertial measurement unit translates and is reoriented as the interactive object 104 is translated and reoriented. In some embodiments, the inertial measurement unit(s) 158 can include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the IMU 158 may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

In this manner, the IMU(s) 158 can be configured to detect inertial input indicative of movement associated with the interactive object 104. The inertial measurement unit(s) 158 can generate inertial data based on the inertial input. The inertial data can be indicative of a position, velocity, and/or an acceleration of the interactive object. In this manner, the IMU 158 can generate one or more outputs representing one or more three-dimensional motions of the interactive object 104.

Motion manager 119 is capable of interacting with computing devices 106, touch sensor 102, IMU 158, and/or other sensors effective to aid, in some cases, control of applications at computing devices 106 through movements including touch-inputs received by touch sensor 102 and motions detected by IMU 158. In FIG. 2, motion manager 119, also referred to as a gesture manager, is implemented at removable electronics module 206. It is noted, however, that motion manager 219 may additionally or alternatively be implemented at internal electronics module 124, a computing device 106 remote from the interactive object, or some combination thereof. Motion manager 119 may be implemented as a standalone application in some embodiments. In other embodiments, motion manager 119 may be incorporated with one or more applications at a computing device.

A predefined motion such as a predetermined gesture or other predetermined movement can be determined based on touch input detected by the touch sensor 102 and/or movement detected by an inertial measurement unit 158 or other sensor. For example, motion manager 119 can determine a predefined motion based on touch data, such as single-finger touch gesture, a double-tap gesture, a two-finger touch gesture, a swipe gesture, and so forth. As another example, motion manager 119 can determine a predefined motion based on movement data such as a velocity, acceleration, etc. as can be determined by inertial measurement unit 158.

A functionality associated with a predefined motion can be determined by motion manager 119 and/or an application at a computing device. In some examples, it is determined whether the touch data corresponds to a request to perform a particular functionality. For example, motion manager 119 determines whether touch data corresponds to predefined motion (e.g., gesture) that is mapped to a particular functionality, such as disabling the remote computing device from responding to inputs from the interactive object. For instance, one or more separation motions may map to functionality that disables the remote computing device from triggering a text message, answering a phone call, creating a journal entry, etc. in response to signals from the interactive object. As described throughout, any type of pre-determined user input or motion may be used to trigger functionality that disables the remote computing device from initiating functionality in response to inputs from the interactive object.

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other than those illustrated in FIG. 2, such as sensors, light sources (e.g., LED's), displays, speakers, and so forth.

The motion manager can utilize one or more machine-learned models for detecting motion such as gestures and movements associated with interactive object 104. As described in more detail hereinafter, the one or more machine-learned models can be distributed across one or more computing devices. For example, a machine-learned model can be distributed at microprocessor 128, microprocessor 152, and/or computing device 106.

Figure 3:
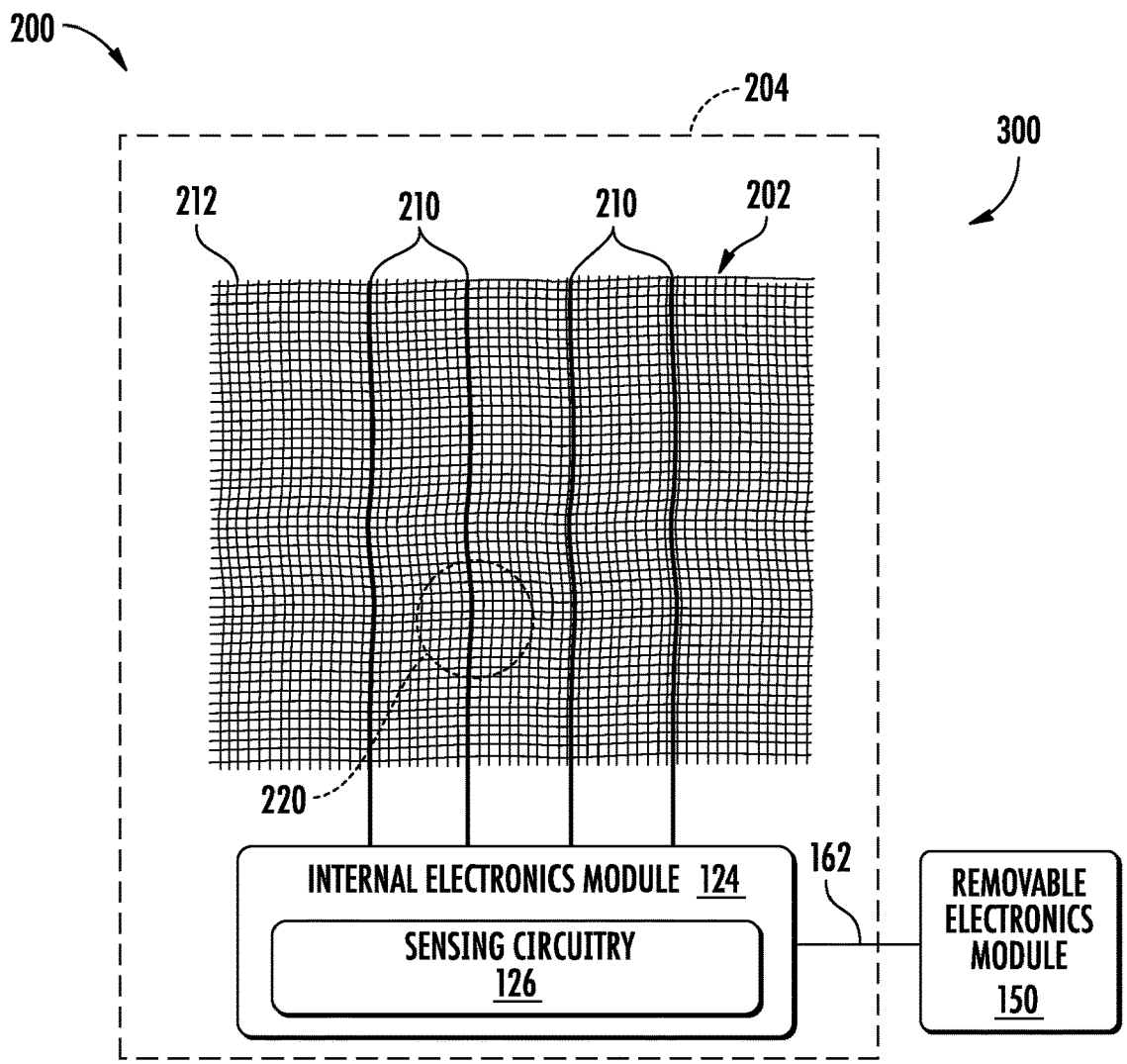
FIG. 3 depicts an example of a touch sensor in accordance with example embodiments of the present disclosure.
Figure 3:
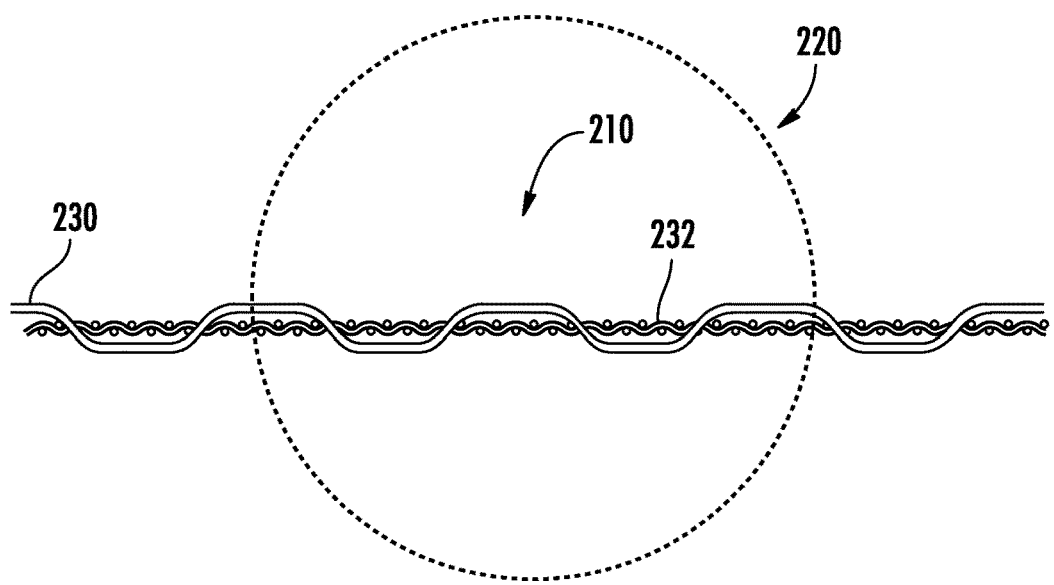

FIG. 3 illustrates an example 200 of an interactive object 204 with multiple electronics modules in accordance with one or more implementations. In this example, the sensing lines 110 are implemented as conductive threads. Touch sensor 202 includes non-conductive threads 212 woven with conductive threads 210 to form a capacitive touch sensor 202 (e.g., interactive textile). It is noted that a similar arrangement may be used to form a resistive touch sensor. Non-conductive threads 212 may correspond to any type of non-conductive thread, fiber, or fabric, such as cotton, wool, silk, nylon, polyester, and so forth.

At 220, a zoomed-in view of conductive thread 210 is illustrated. Conductive thread 210 includes a conductive wire 230 or a plurality of conductive filaments that are twisted, braided, or wrapped with a flexible thread 232. As shown, the conductive thread 210 can be woven with or otherwise integrated with the non-conductive threads 212 to form a fabric or a textile. Although a conductive thread and textile is illustrated, it will be appreciated that other sensing lines and substrates may be used, such as flexible metal lines formed on a plastic substrate.

In one or more implementations, conductive wire 230 is a thin copper wire. It is to be noted, however, that the conductive wire 230 may also be implemented using other materials, such as silver, gold, or other materials coated with a conductive polymer. The conductive wire 230 may include an outer cover layer formed by braiding together non-conductive threads. The flexible thread 232 may be implemented as any type of flexible thread or fiber, such as cotton, wool, silk, nylon, polyester, and so forth.

Capacitive touch sensor 202 can be formed cost-effectively and efficiently, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 212 with conductive threads 210 to create capacitive touch sensor 202. In another example, capacitive touch sensor 202 can be formed using a predefined arrangement of sensing lines formed from a conductive fabric such as an electro-magnetic fabric including one or more metal layers.

The conductive threads 210 can be formed into the touch sensor 202 in any suitable pattern or array. In one embodiment, for instance, the conductive threads 210 may form a single series of parallel threads. For instance, in one embodiment, the capacitive touch sensor may comprise a single plurality of parallel conductive threads conveniently located on the interactive object, such as on the sleeve of a jacket.

In an alternative embodiment, the conductive threads 210 may form a grid that includes a first set of substantially parallel conductive threads and a second set of substantially parallel conductive threads that crosses the first set of conductive threads to form the grid. For instance, the first set of conductive threads can be oriented horizontally and the second set of conductive threads can be oriented vertically, such that the first set of conductive threads are positioned substantially orthogonal to the second set of conductive threads. It is to be appreciated, however, that conductive threads may be oriented such that crossing conductive threads are not orthogonal to each other. For example, in some cases crossing conductive threads may form a diamond-shaped grid. While conductive threads 210 are illustrated as being spaced out from each other in FIG. 3, it is to be noted that conductive threads 210 may be formed very closely together. For example, in some cases two or three conductive threads may be weaved closely together in each direction. Further, in some cases the conductive threads may be oriented as parallel sensing lines that do not cross or intersect with each other.

In example 200, sensing circuitry 126 is shown as being integrated within object 104, and is directly connected to conductive threads 210. During operation, sensing circuitry 126 can determine positions of touch-input on the conductive threads 210 using self-capacitance sensing or projective capacitive sensing.

For example, when configured as a self-capacitance sensor, sensing circuitry 126 charges crossing conductive threads 210 (e.g., horizontal and vertical conductive threads) by applying a control signal (e.g., a sine signal) to each conductive thread 210. When an object, such as the user's finger, touches the grid of conductive thread 210, the conductive threads 210 that are touched are grounded, which changes the capacitance (e.g., increases or decreases the capacitance) on the touched conductive threads 210.

Sensing circuitry 126 uses the change in capacitance to identify the presence of the object. When a grid is used, sensing circuitry 126 detects a position of the touch-input by detecting which horizontal conductive thread is touched, and which vertical conductive thread is touched by detecting changes in capacitance of each respective conductive thread 210. Sensing circuitry 126 uses the intersection of the crossing conductive threads 210 that are touched to determine the position of the touch-input on the grid of conductive threads 210. For example, sensing circuitry 126 can determine touch data by determining the position of each touch as X,Y coordinates on the grid of conductive thread 210.

Alternately, when implemented as a projective capacitance sensor, sensing circuitry 126 charges a single set of conductive threads 210 (e.g., vertical conductive threads 210) by applying a control signal (e.g., a sine signal) to the single set of conductive threads 210. Then, sensing circuitry 126 senses changes in capacitance in the other set of conductive threads 210 (e.g., vertical conductive threads).

In a projective capacitance implementation, vertical conductive threads are not charged and thus act as a virtual ground. However, when horizontal conductive threads are charged, the horizontal conductive threads capacitively couple to vertical conductive threads. Thus, when an object, such as the user's finger, touches the grid of conductive thread, the capacitance changes on the vertical conductive threads (e.g., increases or decreases). Sensing circuitry 126 uses the change in capacitance on vertical conductive threads to identify the presence of the object. To do so, sensing circuitry 126 detects a position of the touch-input by scanning vertical conductive threads to detect changes in capacitance. Sensing circuitry 126 determines the position of the touch-input as the intersection point between the vertical conductive thread with the changed capacitance, and the horizontal conductive thread on which the control signal was transmitted. For example, sensing circuitry 126 can determine touch data by determining the position of each touch as X,Y coordinates on the grid of conductive thread.

Whether implemented as a self-capacitance sensor or a projective capacitance sensor, the conductive thread 210 and sensing circuitry 126 is configured to communicate the touch data that is representative of the detected touch-input to motion manager 119 (e.g., at removable electronics module 150). The microprocessor 152 may then cause communication of the touch data, via network interface 156, to computing device 106 to enable the device to determine gestures based on the touch data, which can be used to control object 104, computing device 106, or applications implemented at computing device 106. In some implementations, a predefined motion may be determined by the internal electronics module and/or the removable electronics module and data indicative of the predefined motion can be communicated to a computing device 106 to control object 104, computing device 106, or applications implemented at computing device 106.

In accordance with some embodiments, a plurality of sensing lines can be formed from a multilayered flexible film to facilitate a flexible sensing line. For example, the multilayered film may include one or more flexible base layers such as a flexible textile, plastic, or other flexible material. One or more metal layers may extend over the flexible base layer(s). Optionally, one or more passivation layers can extend over the one or more flexible base layers and the one or more metal layer(s) to promote adhesion between the metal layer(s) and the base layer(s). In accordance with some examples, a multilayered sheet including one or more flexible base layers, one or more metal layers, and optionally one or more passivation layers can be formed and then cut, etched, or otherwise divided into individual sensing lines. Each sensing line can include a line of the one or more metal layers formed over a line of the one or more flexible base layers. Optionally, a sensing line can include a line of one or more passivation layers overlying the one or more flexible base layers. An electromagnetic field shielding fabric can be used to form the sensing lines in some examples.

Figure 4:
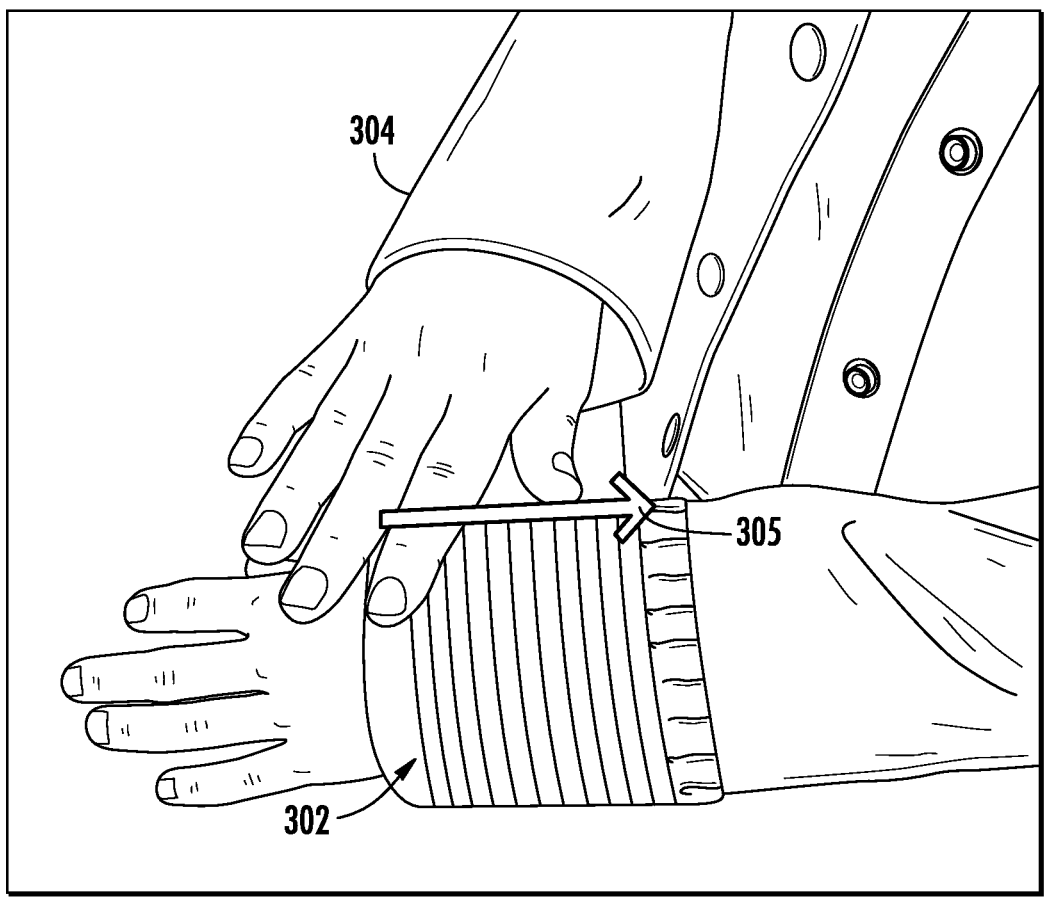
FIG. 4 illustrates an example of a user interaction with an interactive object comprising an interactive garment including a touch sensor in accordance with example embodiments of the present disclosure.

FIG. 4 is a perspective view of an example of a user interacting with an interactive object in accordance with example embodiments of the present disclosure. In this example, the interactive object is an interactive garment 304 having a capacitive touch sensor 302 integrated in the cuff. By way of example, the user can perform a gesture by brushing in on the cuff (as depicted by arrow 650) of the interactive object 104 cuff where the capacitive touch sensor 302 is placed. Motion manager 119 can be configured to initiate and/or implement one or more functionalities in response to the brush in gesture. For example, a user may perform a brush in gesture in order to receive a notification related to application at the remote computing device (e.g., having a text message converted into an audible output at the remote computing device). Note that any type of touch, tap, swipe, hold, or stroke gesture may be recognized by capacitive touch sensor 302. In an alternate example, a resistive touch sensor may be used rather than capacitive touch sensor.

Figure 5:
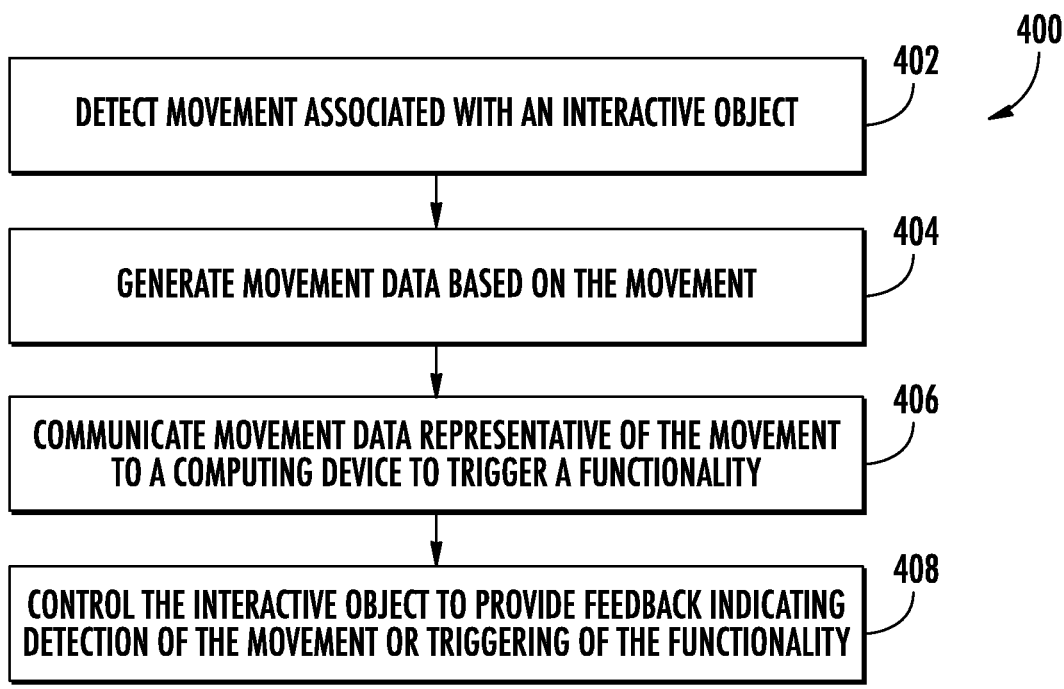
FIG. 5 is a flowchart depicting an example process in accordance with example embodiments of the present disclosure.
Figure 6:
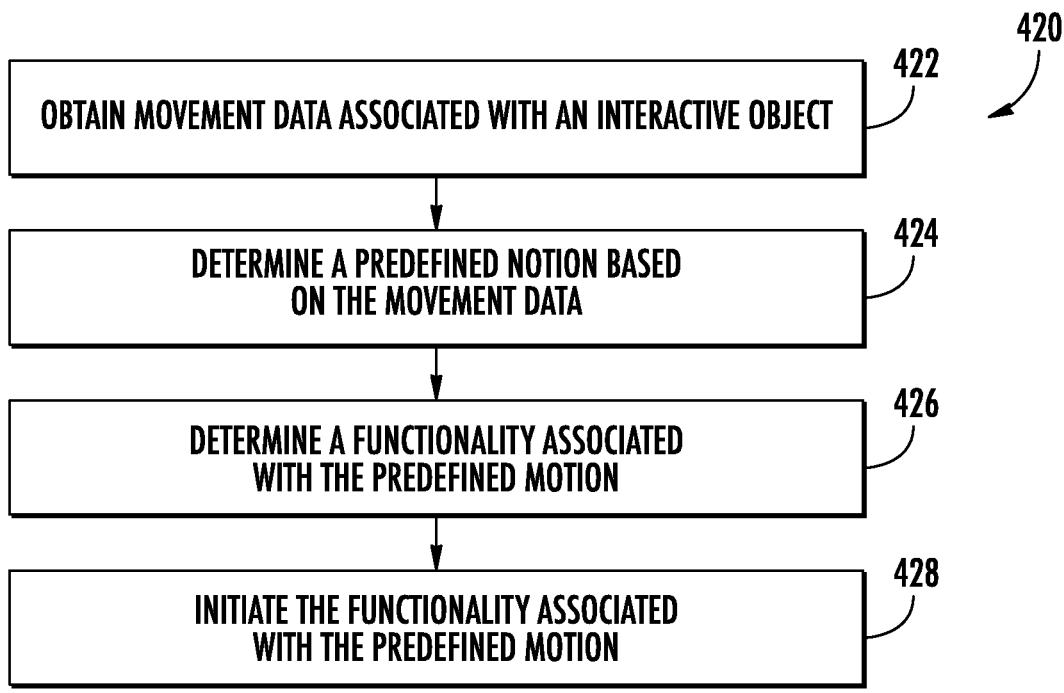
FIG. 6 is a flowchart depicting an example process in accordance with example embodiments of the present disclosure.
Figure 15:
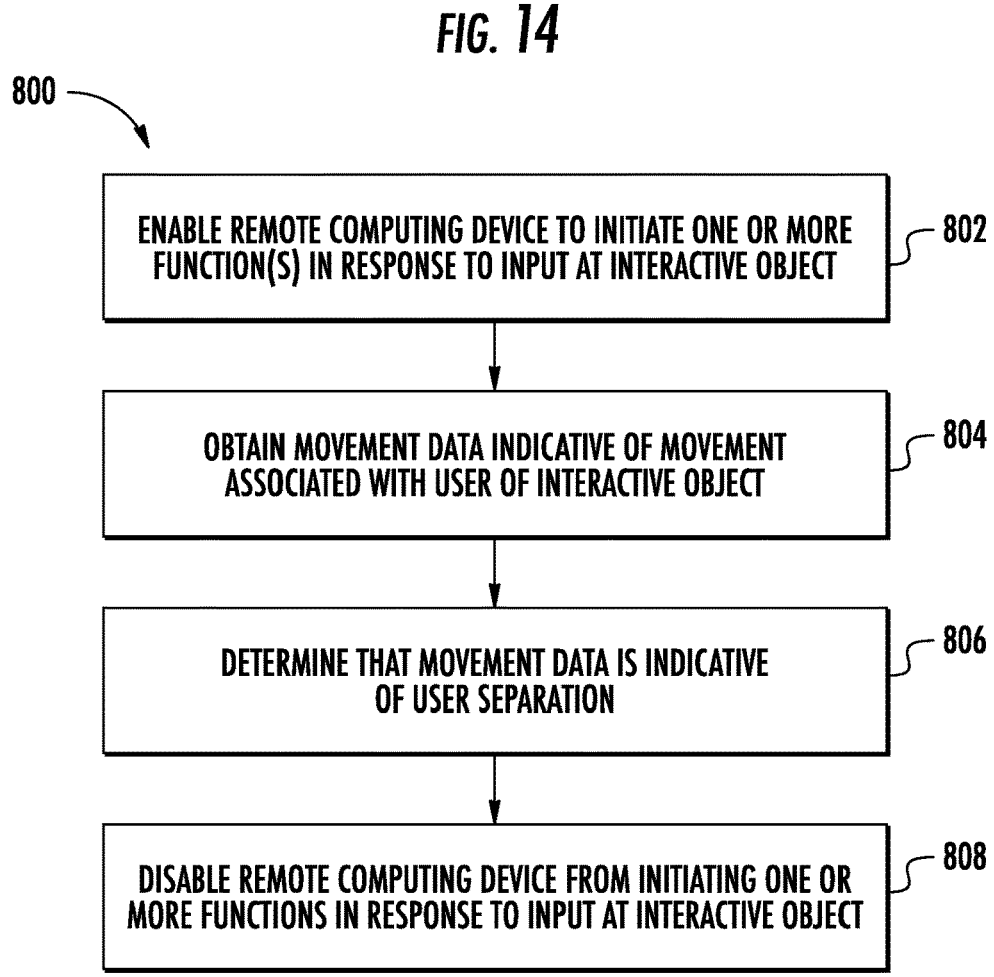
FIG. 15 depicts a flowchart describing an example method of managing interactive object input in accordance with example embodiments of the present disclosure.

FIGS. 5 and 6 illustrate an example process 400 (FIG. 5) of generating touch data using an interactive object, and an example process 420 (FIG. 6) of determining gestures or other motions usable to control a computing device or applications at the computing device based on touch data received from an interactive object. These methods and other methods herein are shown as sets of blocks that specify operations performed but are not necessarily limited to the order or combinations shown for performing the operations by the respective blocks. One or more portions of process 400, and the other processes described, can be implemented by one or more computing devices such as, for example, one or more computing devices of a computing environment 100 as illustrated in FIG. 1, computing environment 190 as illustrated in FIG. 2, computing environment 200 as illustrated in FIG. 3, or a computing environment 900 as illustrated in FIG. 15. While in portions of the following discussion reference may be made to a particular computing environment, reference to which is made for example only. The techniques are not limited to performance by one entity or multiple entities operating on one device. One or more portions of these processes can be implemented as an algorithm on the hardware components of the devices described herein.

At (402), process 400 may include detecting movement associated with a user of the interactive object. For example, block 402 may include detecting touch-input to a set of sensing lines such as conductive threads woven into an interactive textile or otherwise attached to a flexible substrate. For example, sensing circuitry 126 (FIG. 2) can detect touch-input to a set of sensing lines 110 forming a touch sensor 102 (FIG. 1) when an object, such as a user's finger, touches touch sensor 102. Touch input provided to the set of sensing lines is one example of movement associated with the interactive object that can be detected by one or more sensors of the interactive object. As another example, movement can be detected by one or more inertial measurement units of the interactive object indicating a velocity and/or acceleration of the interactive object, for example.

At (404), movement data such as touch data is generated based on the touch-input. For example, sensing circuitry 126 can generate sensor data such as touch data based on the touch-input. The touch data may include a position of the touch-input on a set of sensing lines 110. In another example, the movement data can include inertial measurement unit data based on movement of the interactive object as can be detected by an inertial measurement unit. To detect the touch-input and/or a position of the touch input, sensing circuitry 126 can use self-capacitance sensing, projective capacitance sensing, or other techniques At (406), movement data is communicated to a computing device to control the computing device or one or more applications at the computing device. For example, communication interface 162 at object 104 can communicate the touch data generated by sensing circuitry 126 to motion manager 119 implemented at removable electronics module 150. Motion manager 119 may be implemented at object 104, in which case communication interface 162 may communicate the touch data to motion manager 119 via a wired connection. Additionally or alternatively, motion manager 119 may be implemented remote from object 104, in which case network interface 156 may communicate the touch data to motion manager 119 via network 108. It is noted that the movement data such as touch data may include various types of data. For example, the movement data may include raw sensor data in some examples. In other examples, the movement data may include data indicative of a motion, gesture, or intermediate representation of the sensor data as has been determined by the object (e.g., by microprocessor 128 and/or microprocessor 152).

Optionally, the interactive garment can be controlled to provide feedback indicating detection of the touch-input or triggering of the functionality. For example, sensing circuitry 126 can control one or more output devices at the interactive object to provide feedback indicating the touch-input was detected, such as by controlling a light source to blink or controlling a vibration component to vibrate. As another example, sensing circuitry 126 can control one or more output devices to provide feedback indicating that a particular function has been triggered. For instance, an LED can be integrated into the sleeve of an interactive garment, and is controlled to output light (e.g., by blinking) in response to detecting the touch-input or in response to confirming that the touch-input caused the particular functionality to be triggered. An LED can be integrated into an external module in some cases. Other output devices including visual, audible, and haptic output devices can be integrated into an interactive object or external module.

FIG. 6 illustrates an example process 420 of determining predefined motions such as gestures usable to control a computing device or applications at the computing device based on movement data received from an interactive object. Process 520 includes initiating a functionality that is triggered by user interaction with an interactive garment. The computing device may be local to the interactive object, such as incorporated within a garment or object, or may be remote to the interactive object, such as a smartphone or a remote computing device such as a server.

At (422), movement data such as touch data or inertial measurement unit data is received from an interactive object. For example, a network interface at a computing device 106 can receive touch data from network interface 216 at interactive object 104 that is communicated to motion manager 119 in one example. If motion manager 119 is implemented at the interactive object, the movement data may be received by an internal electronics module or removable electronics module of the interactive object.

At (424), a predetermined motion such as a gesture is determined based on the touch data or other movement data. For example, motion manager 119 can determine a predefined motion such as a gesture based on the touch data, such as single-finger touch gesture, a double-tap gesture, a two-finger touch gesture, a swipe gesture, and so forth. In another example, motion manager 119 determines a predefined motion based on inertial measurement unit data, such as a predetermined motion detected by movement of the user an interactive object.

At (426), a functionality associated with the predefined motion is determined. In some examples, it is determined whether the movement data corresponds to a request to perform a particular functionality. For example, motion manager 119 can determine whether touch data corresponds to a user input or gesture that is mapped to a particular functionality, such as triggering an output response such as an audible output associated with a text or other message, triggering a text message, answering a phone call, creating a journal entry, and so forth. As described throughout, any type of user input or gesture may be used to trigger the functionality, such as swiping, tapping, or holding touch sensor 102. In one or more implementations, motion manager 119 enables application developers or users to configure the types of user input or gestures that can be used to trigger various different types of functionalities.

At (428), the functionality is initiated. For example, motion manager 119 can cause a particular functionality to be performed, such as by obtaining data associated with an application and initiating an output response that provides an indication of the data, answering a phone call, creating a journal entry, increasing the volume on a television, turning on lights in the user's house, opening the automatic garage door of the user's house, and so forth.

According to example embodiments of the present disclosure, functionality at a remote computing device 106 and/or interactive object 104 can be disabled or enabled in response to the detection of one or more predefined motions. For example, motion manager 119 can disable a computing device 106 remote from the interactive object from initiating one or more functions in response to input received interactive object, in some examples, motion manager 119 may provide one or more notifications or control signals to the remote computing device indicating that the remote computing device should be disabled from initiating one or more functions in response to input received at the interactive object. In other examples, motion manager 119 may provide one or more notifications of the detection of a predefined gesture associated with a user separation and the remote computing device may act upon such notifications to disable the remote computing device from initiating one or more functions.

In accordance with example embodiments, movement data associated with a touch sensor 102 such as a resistive or capacitive touch sensor 302 integrated within an interactive object as shown in FIG. 4 can be utilized to detect user separation from an interactive object. As earlier described, a touch sensor 102 may be principally configured to receive touch input at an outer surface of the interactive object 104. Other inputs, however, may be detected by a touch sensor 102. For example, movement of a user's arm or other body part within the sleeve of interactive object 104 may be detected as a touch input to touch sensor 102, in accordance with some examples, such unintentional inputs may result in detections of movement that can be utilized to detect a user separation from and/or a user attachment with an interactive object.

Such inputs have traditionally been viewed as noise and ignored by touch sensors such as touch sensor 102. For example, in some implementations, touch sensors include shields (e.g., of additional fabric, plastic covering, etc.) to reduce noise that may result from detections by touch sensors due to touch inputs based on the movement of an interactive object. By way of example, a capacitive touch sensor implemented on a jacket may include a shield positioned between the user's arm and the underside of the touch sensor to reduce detections of touch input resulting from the capacitive touch sensor moving relative to the user's arm as the user puts on, wears, or takes off the jacket. Nevertheless, unintentional or inadvertent touch inputs may be detected as a result of the user moving within the sleeve or otherwise at an opposite surface intended for use of a touch sensor.

In accordance with some implementations, a touch sensor may detect unintentional or everyday inputs to generate data that can be used to facilitate a determination of a movement associated with the interactive object. In this way, rather than ignoring such data, the touch sensor can detect touch input to one or more sensing line(s) in response to a user moving the interactive object or their body within the interactive object. Such movements may be associated with user attachment and/or user separation from an interactive object. The movement may be detected and utilized to enable and/or disable functionality at a remote computing device based on movement detected at the interactive object.

Figure 7:
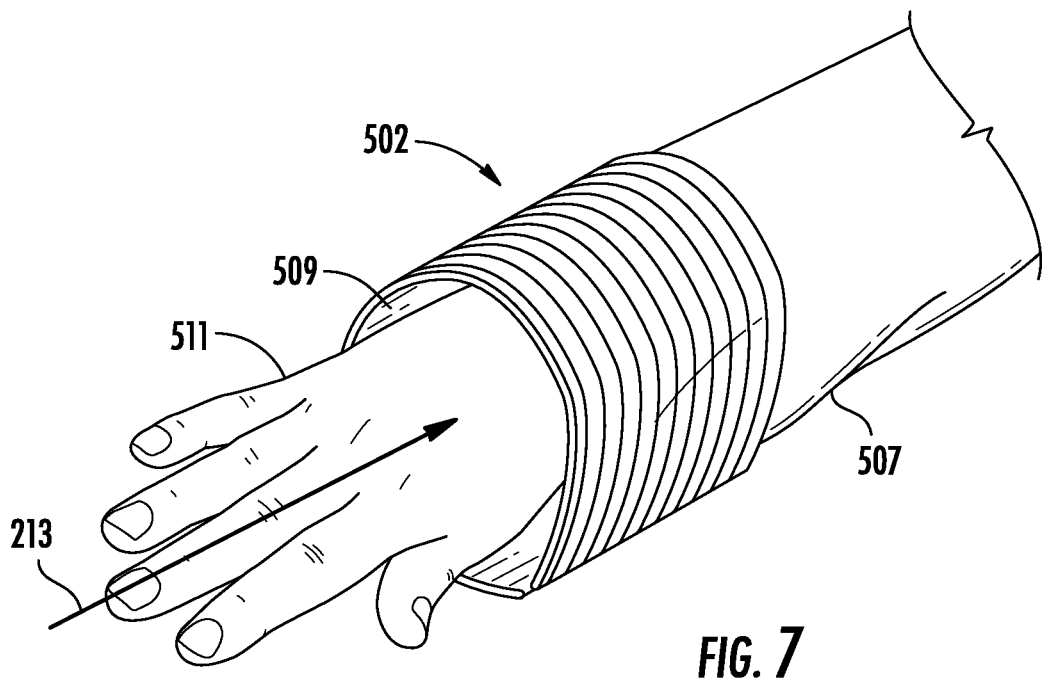
FIG. 7 illustrates an example of a user separation from an interactive object as may be detected by a touch sensor for determining a state of the interactive object in accordance with example embodiments of the present disclosure.

FIG. 7 depicts an example of an interactive object including a touch sensor and the detection of a user separation from the interactive object based on touch input detected by the touch sensor. In this example, an interactive object is configured as an interactive garment 504 having a sleeve 507 with a cuff in which a touch sensor 502 is integrated. Touch sensor 502 is one example of a touch sensor 102, 202, or 302 as earlier described. Touch sensor 502 includes a plurality of sensing lines such as conductive threads woven or otherwise integrated within the sleeve 507 of interactive garment 504. The movement of the user's arm through the sleeve as may occur in removing the jacket is illustrated by arrow 513. For example, in removing interactive garment 504, a user 511 may move their arm through sleeve 507 in the direction of arrow 513 to remove the sleeve 507 from their body.

While the movement of the user's arm through the sleeve in removing the interactive garment 504 occurs opposite to the input surface of touch sensor 502, the movement of the user's arm may nevertheless be perceptible by the touch sensor as a detectable touch input. The movement of a user's arm within the sleeve at a location adjacent to the interior surface 509 of the jacket and opposite to the location of the touch sensor 502 on the outer surface of the jacket may result in touch input data that can be uniquely identified by motion manager 119. By way of example, a machine-learned model can be trained to detect such a touch-input using labeled training data associated with a user moving their arm through a sleeve including such a touch sensor. Other examples of input to a touch sensor 502 that may be detected as a user separation include, but are not limited to, inputs to a touch sensor associated with a user removing the strap of a backpack or a purse from their shoulder, a user placing an interactive object on the ground, a user removing spectacles, etc. In some cases, such inputs are unintentional inputs provided by a user while engaging in a motion associated with a user separation from the interactive object.

In some examples, a predetermined motion associated with a user separation from an interactive object may include movement detected while the user is coupled to the interactive object as well as movement while the user is detached from the interactive object. For instance, a predefined motion corresponding to a user separation may include a movement associated with removal of the interactive object followed by a movement associated with the interactive object being stationary thereafter. Thus, a predefined motion or gesture may include a first detected movement followed by a minimum period of non-detected movement.

Figure 8:
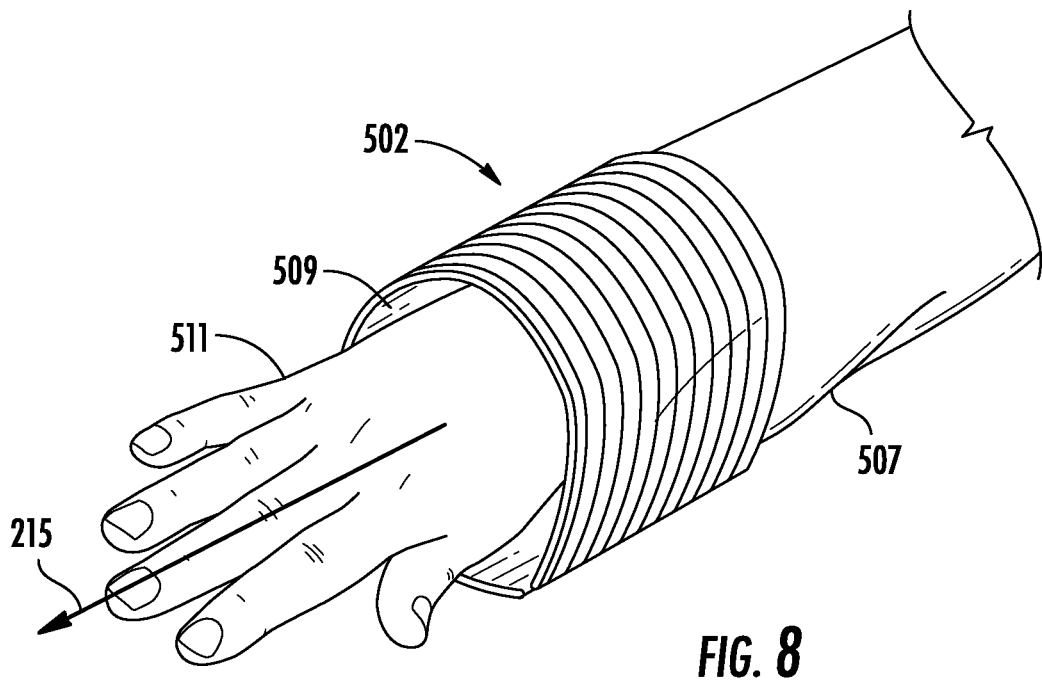
FIG. 8 illustrates an example of a user attachment to an interactive object as may be detected by a touch sensor for determining a state of the interactive object in accordance with example embodiments of the present disclosure.

FIG. 8 depicts an example of interactive garment 504 and a user attachment motion. The movement of the user's arm through the sleeve as may occur in putting on the jacket is illustrated by arrow 515. For example, in placing the interactive garment 504 on their body, a user 511 may move their arm through sleeve 507 in the direction of arrow 515 to place their arm within the sleeve 507 of the garment.

The movement of a user's arm within the sleeve may result in touch input data that can be uniquely identified by motion manager 119 as the user taking off the jacket. By way of example, a machine-learned model can be trained to detect such a touch-input using labeled training data associated with a user moving their arm through a sleeve to remove an interactive garment including such a touch sensor. Other examples of input to a touch sensor 502 that may be detected as a user attachment include, but are not limited to, inputs to a touch sensor associated with a user placing the strap of a backpack or a purse on their shoulder, a user picking up an interactive object, a user placing spectacles on their face, etc. In some cases, such inputs are unintentional inputs provided by a user while engaging in a motion associated with a user attachment to the interactive object.

Figure 9:
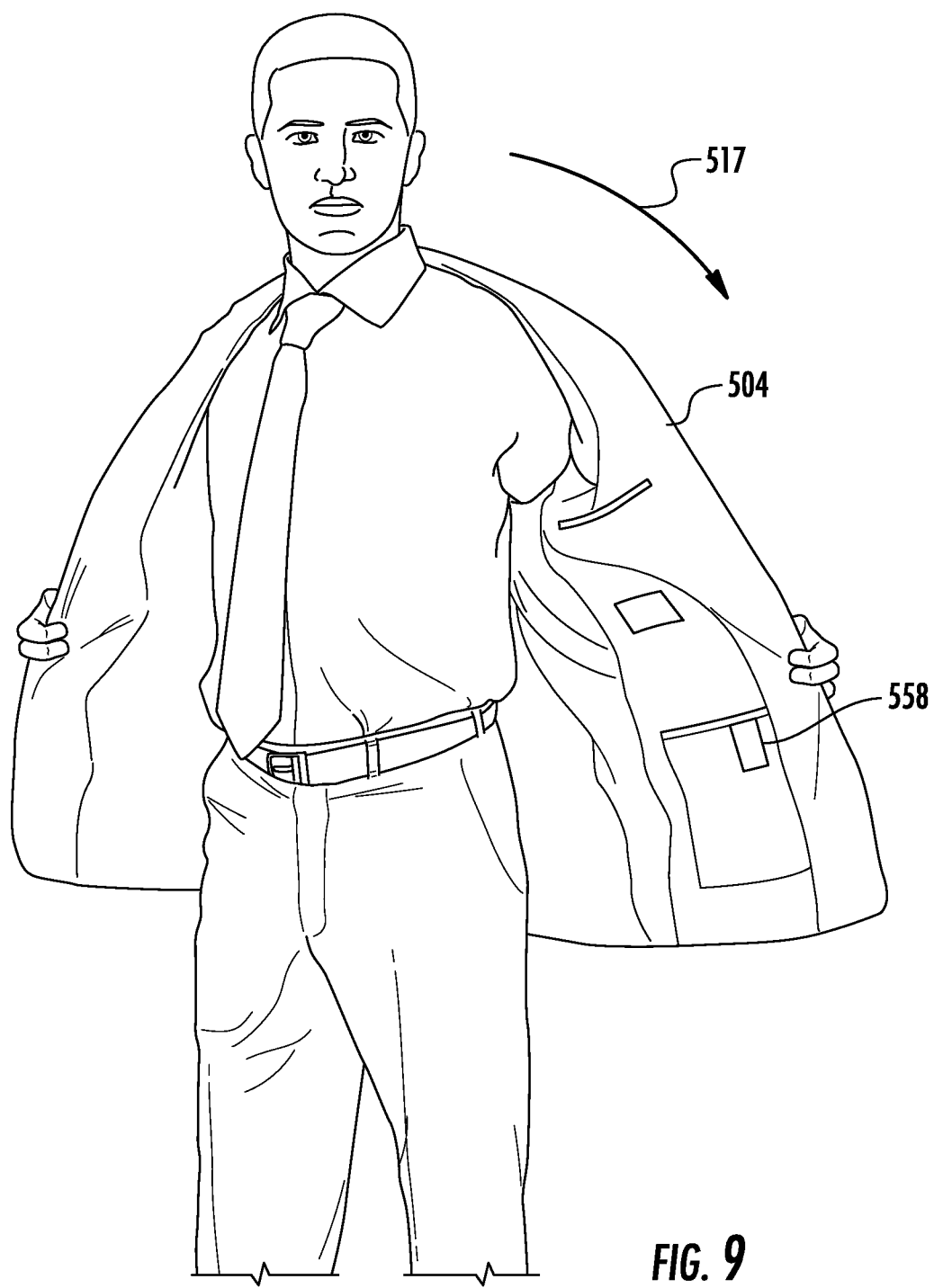
FIG. 9 illustrates an example of a user separation from an interactive object as may be detected by an inertial measurement unit for determining a state of the interactive object in accordance with example embodiments of the present disclosure.

FIG. 9 depicts an example of interactive garment 504 in which an inertial measurement unit (IMU) 558 sensor has been integrated. FIG. 9 illustrates the detection of a user separation from the interactive object based on movement detected by the IMU 558. In this example, IMU 558 is integrated within a main body portion of interactive garment 504, however, it will be appreciated that an IMU may be integrated within other portions of the jacket such as a sleeve, lapel, cuff, etc. In some instances, multiple IMU's may be integrated within an interactive object, such as by incorporating an IMU in the main body of a jacket as well as one or more IMU's in the sleeves, collar, or other portion of the jacket. The movement of the interactive jacket as may occur in removing the jacket is illustrated by arrow 517. The movement of the user in removing the jacket may result in a perceptible movement of the jacket that is detected by IMU 558. The movement of the jacket back and down a user's arm may result in a detectable motion that can be uniquely identified by motion manager 119. By way of example, a machine-learned model can be trained to detect such a movement using labeled training data associated with a user removing a jacket including an IMU. Other examples of motions that may be detected as a user separation using an IMU include, but are not limited to, movements associated with a user removing the strap of a backpack or a purse from their shoulder, a user placing an interactive object on the ground, a user removing spectacles, etc. In some cases, such inputs may be unintentional inputs provided by a user while engaging in a motion associated with a user separation from the interactive object. It is noted that an interactive jacket is provided for explanatory purposes only and that any predefined motion associated with a user separation from an interactive object can be used. For example, motions may include a user separating from an interactive object such as, for example, unzipping a jacket, unclipping a watch, pulling off a head band, placing a purse on the ground, etc.

Figure 10:
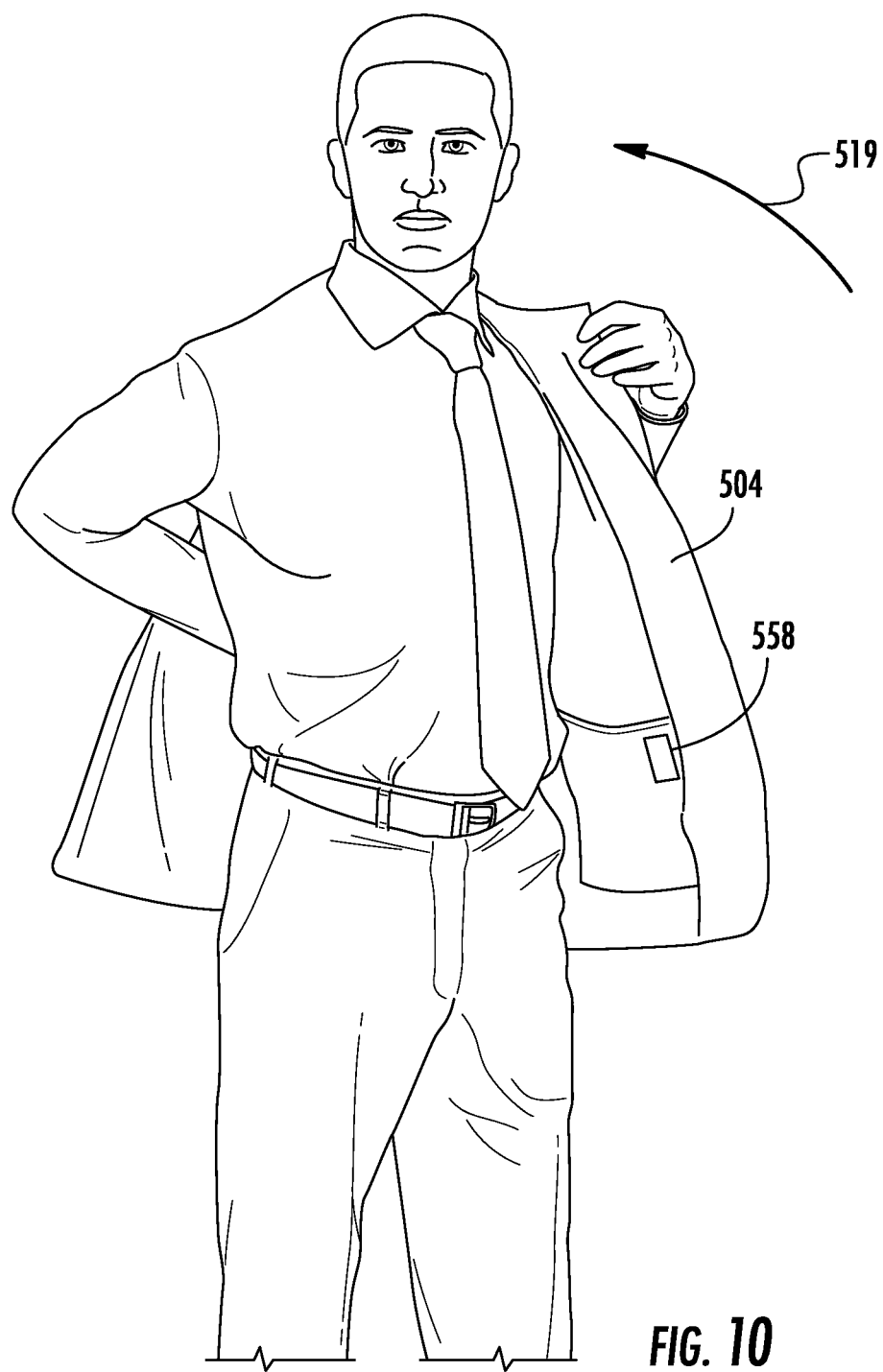
FIG. 10 illustrates an example of a user attachment to an interactive object as may be detected by an inertial measurement unit for determining a state of the interactive object in accordance with example embodiments of the present disclosure.

FIG. 10 depicts an example of interactive garment 504 and a user attachment to the interactive object. The movement of the interactive jacket as may occur in putting on the jacket is illustrated by arrow 519. The movement of the jacket up and over a user's back and being placed on their arms may result in a detectable motion that can be uniquely identified by motion manager 119. By way of example, a machine-learned model can be trained to detect such a movement using labeled training data associated with a user putting on a jacket that includes an IMU. Other examples of motions that may be detected as a user attachment using an MU include, but are not limited to, movements associated with a user placing the strap of a backpack or a purse on their shoulder, a user picking up an interactive object, a user placing spectacles on their face, etc. In some cases, such inputs may be unintentional inputs provided by a user while engaging in a motion associated with a user attachment to the interactive object. It is noted that an interactive jacket is provided for explanatory purposes only and that any predefined motion associated with a user attachment to an interactive object can be used. For example, motions may include a user attaching to an interactive object such as, for example, zipping a jacket, clipping a watch, putting on a hat, picking up a purse, etc.

Figure 11:
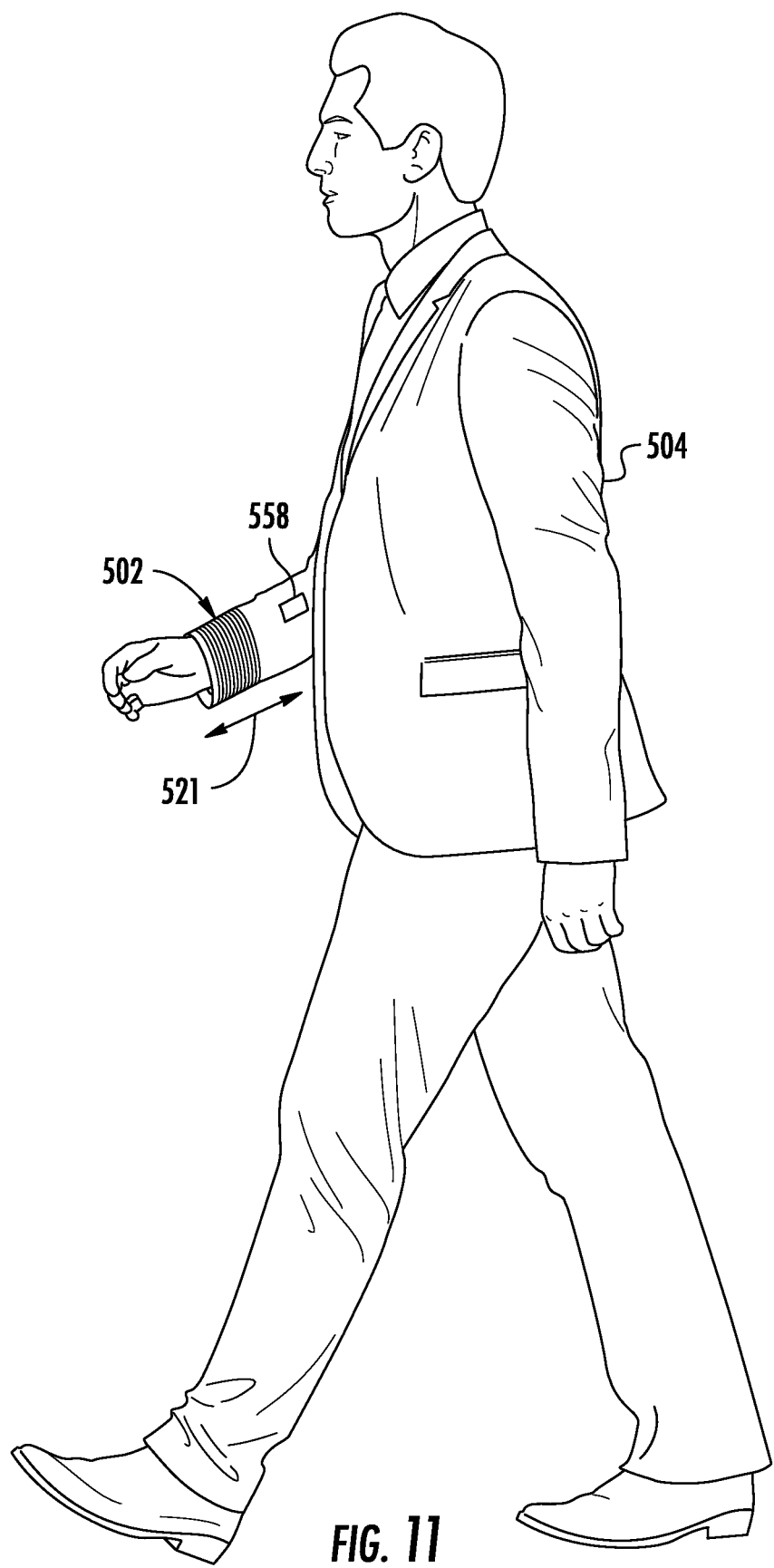
FIG. 11 illustrates an example of a user attachment to an interactive object as may be detected by a touch sensor and/or an inertial measurement unit for determining a state of the interactive object in accordance with example embodiments of the present disclosure.

FIG. 11 depicts another example movement indicative of an attachment of a user to an interactive object 204. A user may engage in any number and types of movements while wearing an interactive garment. Interactive garment 504, via a touch sensor 502 and/or an IMU 558 sensor, can detect movement(s) associated with the user of the interactive object. The touch sensor and/or the IMU sensor can generate sensor data indicative of the movement(s). The movement(s) can be associated with continued use or attachment to the interactive object. For example, the sensor data may be indicative of the user wearing the interactive garment 504. As illustrated, such movements may include a sliding motion of one or more sleeves of interactive garment 504 as the user walks while wearing the jacket. The sliding motion is indicated by arrow 521 in FIG. 12. These movements can be indicative of a continued attachment of a user to the interactive garment 504. Again, an interactive jacket is provided for explanatory purposes only. One or more second predefined motions can include any movement indicative of a user wearing an interactive object such as, for example, a sliding motion of a pant leg, a swinging motion of a purse and/or watch, an ascending and descending motion of a shoe, etc.

Figure 12:
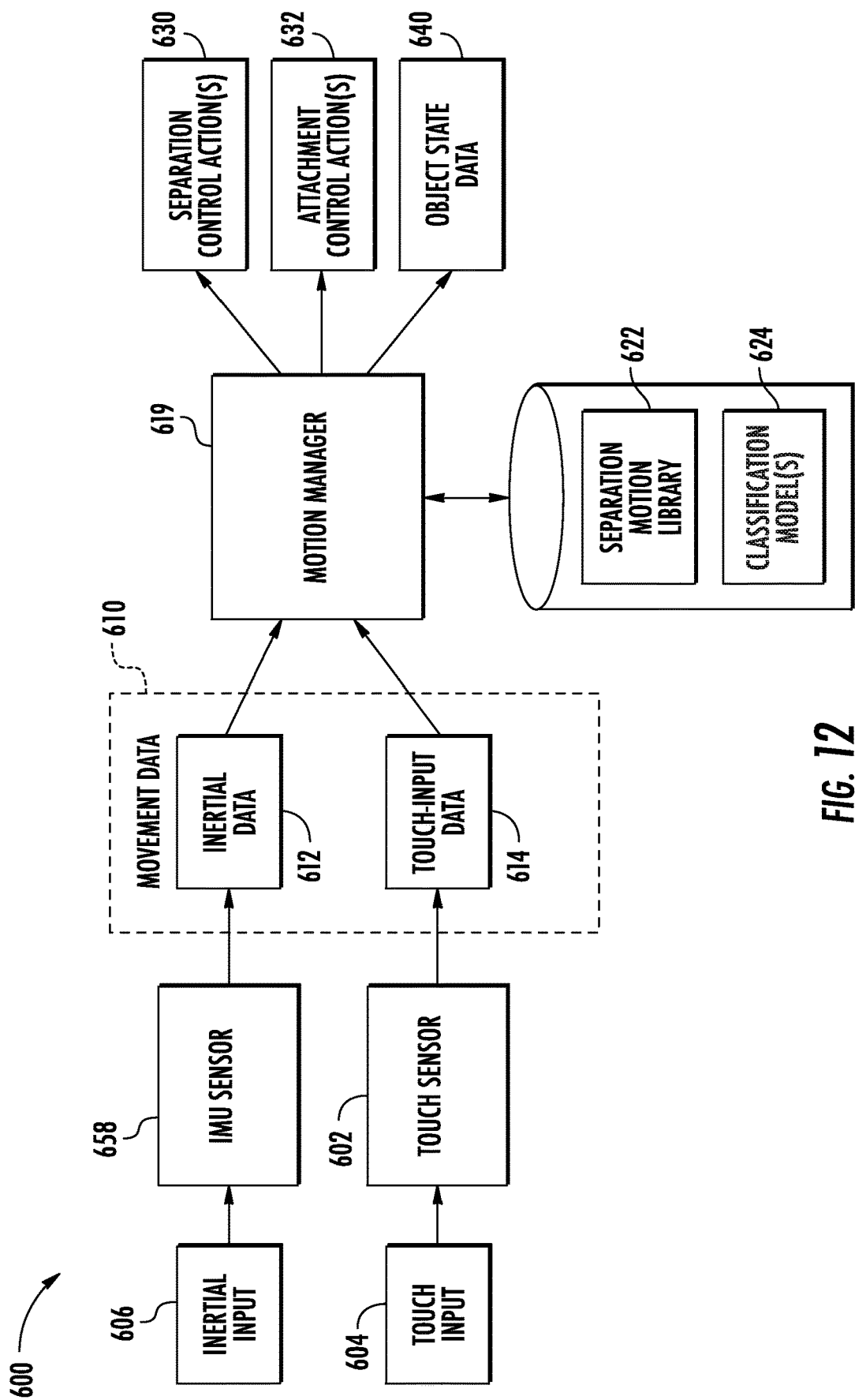
FIG. 12 is a dataflow block diagram depicting an example of detecting predetermined motions at an interactive object for managing inputs to a remote computing device in accordance with example embodiments of the present disclosure.

FIG. 12 is a block diagram depicting an example computing environment 600 and the use of movement data to establish a state between an interactive object and a remote computing device such as a smartphone, cloud computing system, etc. The remote computing device can be enabled or disabled from initiating one or more functions in response to input from the interactive object based on the state data. An interactive object can include one or more sensors that are configured to detect movement associated with the interactive object. The sensor(s) can generate sensor data indicative of movements of the interactive object and/or a user of the interactive object. A touch input 604, for example, can be detected by a touch sensor 602 of the interactive object. Additionally or alternatively, an inertial input 606 can be detected by an inertial measurement unit 658 of the interactive object. In some examples, a removable electronics module that is removably coupled to the interactive object can include one or more inertial measurement units 658.

Movement data 610 can be generated in response to detecting input (e.g., touch input 604, inertial input 606) to the touch sensor 602 and/or the inertial measurement unit 658. Movement data 610 may include sensor data and/or data derived from sensor data. For instance, sensor data may be at least partially processed to generate movement data. As a specific example, movement data can include intermediate representations of sensor data, such as may be generated by one or more machine-learned models.

A motion manager 619 can obtain movement data 610 indicative of movement associated with a user of the interactive object. Motion manager 619 can analyze movement data 610 to determine whether the data is indicative of at least one predefined gesture associated with a user attachment to an interactive object, a user separation from an interactive object, or other user movement. Motion manager 619 may be implemented at an interactive object, such as by microprocessor 152 of removable electronics module 150 and/or microprocessor 128 of interactive object 104, and/or at a remote computing device 106.

In some examples, motion manager 619 may access motion library 622 and/or one or more classification model(s) 624 stored in memory 620 as part of determining whether movement data is associated with a predetermined motion. Motion manager 619 may determine whether movement data matches or is otherwise associated with one or more predetermined motions identified in motion library 622 and/or by one or more machine-learned classification model(s) 324. Motion library 622 can store data indicative of one or more predefined gestures associated with user attachment with an interactive object, user separation from an interactive object, and/or other user actions associated with the interactive object. In some examples, motion library 622 can store a motion definition for each of a plurality of predetermined motions such as gestures. The motion definition for each predetermined motion can identify one or more features associated with the predetermined motion. The predefined motion(s) can be indicative of a user separation, attachment, etc.

Classification model(s) 624 can include one or more machine learned models configured to identify one or more predetermined motions or other movements associated with a user attachment, user separation, or other movement associated with an interactive object. In some examples, a single classification model may be used to identify whether movement data is indicative of a user separation from an interactive object. Similarly, a single machine learned model may be used to classify movement data at indicative of a user attachment to an interactive object. For example, a binary classifier may be utilized for user separation determinations. Movement data may be input to the binary classifier which will output an inference indicative of whether the movement data is indicative of a user separation from an interactive object. Similarly a binary classifier may be utilized that can receive movement data and output an inference of whether the movement data is indicative of a user attachment to an interactive object. In other examples, a plurality of classification models may be utilized to output a classification based on the movement data that is input to the classification model. For example, a first classification model may receive movement data and output an inference as to whether the movement data is indicative of a jacket removal movement. Other examples of gesture library and classification models may be utilized.

One or more first predefined motions identified by motion library 622 and/or classification model(s) 624 can be associated with a user separation from an interactive object. The first predefined motions can include any movement by a user or an interactive object associated with a removal, separation, distancing, or other disassociation of the user from the interactive object. One or more second predefined motions identified by gesture library 322 and/or classification model(s) 324 can be associated with an attachment of a user to an interactive object. The second predefined motions can include any movement by a user or an interactive object that corresponds to wearing, attaching, putting on, decreasing a spacing between, or otherwise associating a user with an interactive object.

Motion manager 619 can identify whether the movement data 610 is indicative of at least one of the plurality of predefined motion(s) identified by motion library and/or classification models 624. For example, the motion manager 619 can analyze the movement data to detect at least one of a plurality of predefined motion(s) by comparing the movement data 610 to a definition or other data describing the plurality of predefined motion. Motion manager 619 can determine whether movement data 610 matches a definition of a predetermined motion from motion library 622.

In some implementations, motion manager 619 can input movement data 610 into a machine-learned classification model 624. Machine-learned classification model 624 can be stored in memory at the interactive object or at one more computing devices 106 remote from the interactive object. In some implementations, the machine-learned classification model 624 can be distributed across multiple computing devices. The machine-learned classification model 624 can be configured to output an inference associated with the plurality of predefined motion(s) based on movement data 610. Motion manager 619 can receive an indication or inference of at least one of the plurality of predefined motion (s) as an output from the machine-learned classification model 624. As a specific example, motion manager 319 may detect a separation based at least in part on an output of the classification model indicating that a predetermined motion or movement associated with a separation has been detected. For example, a classification model 624 may output an inference as to whether a predefined motion associated with removing a jacket was detected. Similarly, motion manager may detect an attachment based at least in part on an output of the classification model indicating that a predetermined gesture or motion associated with an attachment has been detected.

In some examples, a machine-learned classification model 324 can be configured to output direct inference of a separation of a user from an interactive object and/or an attachment of a user to the interactive object based on the movement data. For example, the machine-learned classification model 324 can output an inference of an attachment of a user to an interactive object or an inference of a separation of a user from the interactive object based on movement data. In this manner, the movement data can be input into the machine-learned classification model to receive a direct inference of a separation or attachment. By way of example, the machine-learned classification model 560 can include a machine-learned binary classifier model. A separation classification model can classify the movement data in a binary manner such as whether the movement data is indicative of a separation of a user from the interactive object (e.g., "1") or whether the movement data is not indicative of a separation of a user from the interactive object (e.g., "0"). Similarly, an attachment classification model can classify the movement data in a binary manner such as whether the movement data is indicative of an attachment of a user to the interactive object (e.g., "1") or whether the movement data is not indicative of an attachment of a user to the interactive object (e.g., "0").

Motion manager 619 can initiate one or more separation control actions 630 in response to a detected user separation from an interactive object. In some examples, a separation control action 630 may include generating one or more control signals that can be transmitted to a remote computing device. The remote computing device can receive one or more control signals and initiate one or more actions in response. For example, remote computing device may be disabled from initiating one or more functions in response to input from the interactive object. In other examples, a separation control action 330 may include the direct performance of actions associated with a user separation. For example, where motion manager 619 is implemented at a remote computing device, motion manager 619 may directly disable the remote computing device from initiating functions in response to interactive object input. In either event, a remote computing device can be disabled from initiating one or more functions in response to input from the interactive object based on a detected separation.

Motion manager 619 can initiate one or more attachment control actions 632 in response to a detected user separation from an interactive object. In some examples, an attachment control action may include generating one or more control signals that can be transmitted to a remote computing device. The remote computing device can receive one or more control signals and initiate one or more actions in response. For example, remote computing device may be enabled to initiate one or more functions in response to input from the interactive object. In other examples, an attachment control action 632 may directly enable the remote computing device for initiating functions in response interactive object input. In some examples, a remote computing device may initiate one or more authentication processes in response to an attachment control action. For example, remote computing device may prompt a user for authentication data before enabling the remote computing device for initiating functions in response to inputs at the interactive object.

Figure 13:
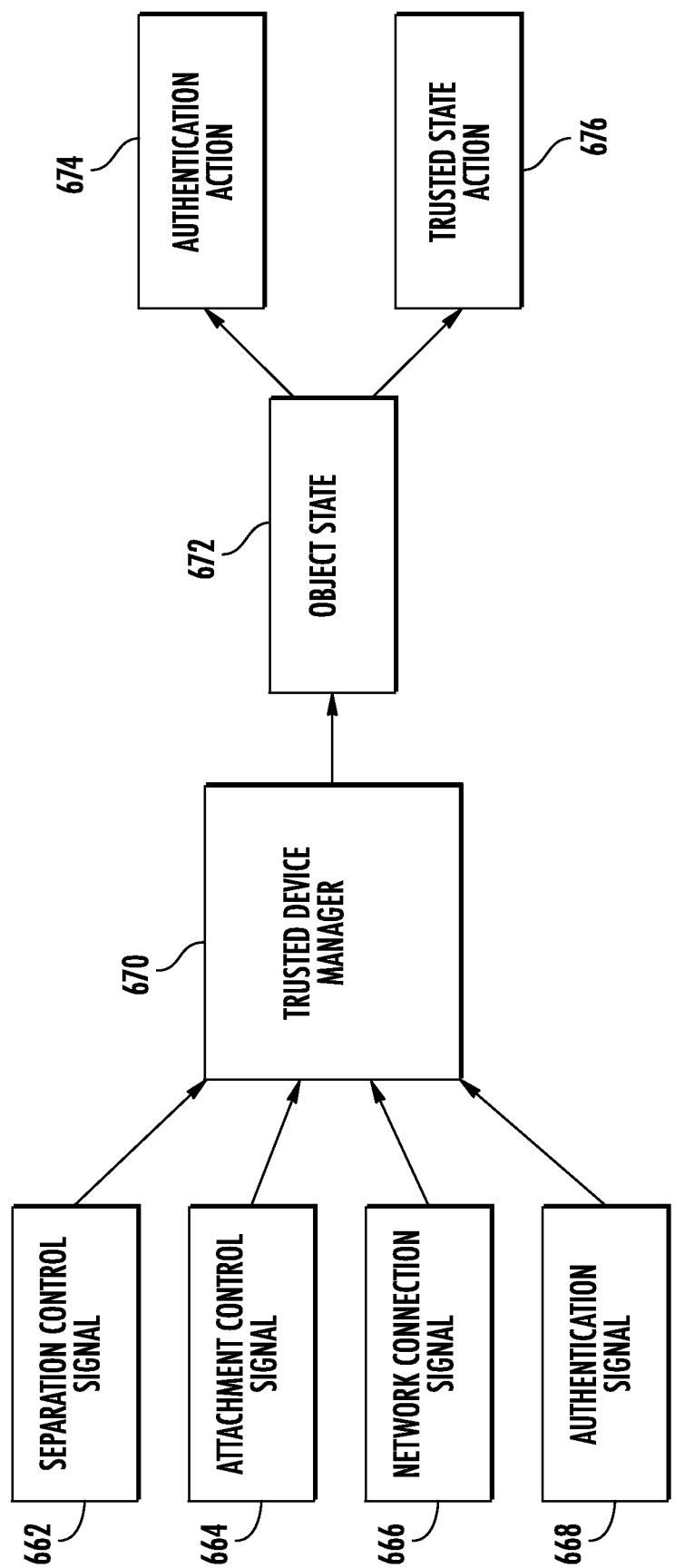
FIG. 13 is a dataflow block diagram depicting an example of managing object state for an interactive object at a computing device in accordance with example embodiments of the present disclosure.

FIG. 13 is a block diagram depicting an example computing environment 660 including a trusted device manager 670 that can manage a trusted state of an interactive object based on detected separations and attachments between the interactive object and a user. Trusted device manager 670 can be implemented at a computing device 106 to manage a trusted state of the interactive object relative to the computing device. In other examples, trusted device manager 670 can be implemented at an interactive object or at a combination of an interactive object and computing device.

Trusted device manager 670 manages the state of an interactive object based on multiple input signals in FIG. 13. As illustrated, trusted device manager 670 can receive separation control signal 662 which may indicate a separation control action 630 generated by the motion manager 619. Similarly, trusted device manager 670 can receive an attachment control signal which may indicate an attachment control action 630 generated by the motion manager 619. Additionally, trusted device manager 670 can receive a network connection signal 666. Network connection signal 666 may indicate whether or not the interactive object is currently connected to the computing device 106 over a network connection such as a bluetooth or NFC connection. Finally, trusted device manager 670 may receive an authentication signal 668 which may indicate whether a user has been successfully authenticated at the interactive object and/or the computing device. For example, trusted device manager 670 may receive an authentication signal 668 indicating that a user has successfully authenticated at the computing device by providing a password, pin, predetermined gesture, etc. In some examples, an additional authentication signal 668 may be received that indicates whether the interactive object has been authenticated at the computing device.

Trusted device manager 670 can use one or more of the signals in FIG. 13 to modify and/or generate state data, including a trusted state identifier for an interactive object. Trusted device manager 670 can generate object state data 672 indicative of a state of the interactive object. The state data can be used to manage access and security at the remote computing device 106 while enhancing the flexibility and convenience of using interactive objects with the remote computing device 106. For example, data indicative of a trusted state of an interactive object can be initialized when the user is associated with the interactive object such as can be detected by wearing or an attachment to the interactive object. In some examples, data indicative of a trusted state can be generated in response to a combination of an authentication signal indicating authentication by a user at the computing device 106 and/or interactive object 104, and an attachment signal indicating user attachment to the interactive object. Similarly, state data indicative of a non-trusted state of the interactive object relative to the remote computing device 106 can be generated in response to detecting a separation of the user from the interactive object. By way of example, trusted device manager 670 may, in response to a separation control signal 662 from the movement manager, generate object state data including a trusted state identifier indicating that the interactive object is not trusted. In response, the computing device 106 may initiate an authentication action 674 to verify that the user is trusted and that inputs should be received from the interactive object. In another example, the trusted device manager 670 can generate date indicative of a non-trusted state in response to a network connection signal 666 indicating that the computing device 106 and the interactive object are not connected over a network connection.

In some examples, the trusted device manager can analyze a temporal relationship between control signals to determine object state data for an interactive object. For example, in order to determine that the interactive object is trusted, the trusted device manager 670 may require that an attachment control signal 664 and an authentication signal 668 be received within a threshold amount of time of one another. In this manner, the trusted device manager 670 can verify that a user was properly authenticated using a password, etc. close in time to the interactive object having been put on by the user, etc. In such examples, the trusted device manager can initiate a trusted state action 676, such as by enabling the computing device 106 to perform actions in response to input received from the interactive object.

In some examples, the trusted device manager 670 can utilize signal decay techniques to further improve security. For example, the trusted device manager 670 may determine an elapsed time since an attachment control signal 664 has been received. If a predetermined amount of time elapses before an attachment control signal 664 is received, the trusted device manager may require a user to reauthenticate by providing user credentials, etc.

According to some aspects, an interactive object can remain authenticated at a remote computing device such as a smartphone even when state data indicative of a non-trusted state is generated. In this manner, the remote computing device can be disabled from performing functions in response to sensor-sensed inputs from the interactive object, but the interactive object can remain authenticated. When the smartphone determines that the interactive object is again trusted, state data indicative of a trusted state can be generated to immediately enable inputs from the interactive object. In some examples, the interactive object can be de-authenticated in response to detecting a user separation from the interactive object.

The state data indicative of the state corresponding to an interactive object can identify whether the interactive object is trusted by the remote computing device 106. The remote computing device 106 can generate state data indicative of a trusted state with at least one interactive object. A remote computing device 106 can be configured, based on the state data indicative of the trusted state, to initiate one or more trusted state actions 676 or functions in response to input from the interactive object. For example, the computing device 106 can accept input data, signals, and/or commands from one or more interactive object(s) without authorization based at least in part on data indicative of a state corresponding to the one or more interactive object(s). In this manner, the trusted state of the interactive object relative to the computing device 106 can enable the interactive object to send and receive messages with the computing device 106 without authenticating each message. If the state data identifies a trusted state, the computing device 106 can be configured to initiate one or more actions in response to receiving one or more commands from the interactive object. Thus, a remote computing device 106 can initiate actions in response to input received at the interactive object without authenticating the interactive object. The interactive object can thus interact with the computing device 106 without separate authentication at the computing device 106.

In some examples, state data indicative of the trusted state of the interactive object relative to the user device can be generated in response to detecting at least one pre-defined motion indicative of an attachment of the user to the interactive object. The computing device 106 can initialize the trusted state at the computing device 106 based at least in part on detecting the attachment. For example, trusted device manager 670 may receive an attachment control signal 664 an initiate a trusted state action 676 indicating that the interactive object is trusted by the computing device.

In some implementations, authentication data can be used in combination with movement data to generate state data associated with an interactive object. The authentication data can be received via user input at the computing device 106, such as through use of one or more soft buttons, hard buttons, microphones, scanners, cameras, etc. configured to receive input from a user of the computing device 106. Additionally or alternatively, authentication data can be received via one or more interactive objects. The authentication data can be generated by the interactive object in response to input received from the user at the interactive object. For example, the authentication data can be generated in response to one or more predefined motions corresponding to a touch input received at a touch sensor. An authentication signal 668 can be provided to the trusted device manager 670 indicating a result of a user authentication.

In some implementations, a trusted state at the computing device 106 can be maintained based on movement data indicative of a movement associated with the user of the interactive object. For example, the computing device 106 can maintain a trusted state at the computing device 106 while the user of the computing device 106 is attached to the interactive object. In some examples, an attachment control signal 664 may indicate a continued attachment between a user and an interactive object. The user device can confirm data indicative of a trusted state at the computing device 106 based on movement data. For example, the user device can periodically receive movement data or data indicative of user attachment or separation from the interactive object. For instance, the interactive object can periodically communicate movement data and/or data indicative of an attachment/separation associated with the interactive object to the computing device 106. In some implementations, the computing device 106 can periodically request movement data and/or data indicative of an attachment/separation of an interactive object. The interactive object can respond to the request by sending current movement data and/or data indicative of a current attachment or separation associated with the interactive object and the computing device 106. The computing device 106 can confirm a trusted state of the interactive object relative to the computing device 106 based at least in part on the current movement. In some examples, an authentication process can be initiated in response to state data indicative of a non-trusted state. According to some implementations, an authentication action can be initiated in response to a predetermine amount of time lapsing since last detecting a user attachment with the interactive object.

State data indicative of a state of the interactive object can be stored at a remote computing device and/or an interactive object. The state data can be stored in memory on the user device. The remote computing device can modify and/or generate state data based on movement data indicative of movement associated with a user of the interactive object. For example, the computing device 106 can store state data indicative of a state associated with each interactive object associated with the computing device 106. For example, the computing device 106 can generate state data indicative of the state of each interactive object communicatively connected to the computing device 106. In this manner, the computing device 106 can manage interactive object input from a plurality of interactive objects.

In addition, or alternatively, the state data can be stored in memory on the interactive object. In such a case, the interactive object can modify and/or generate new state data based on movement data indicative of movement associated with the user of the interactive object. In such a case, each interactive object can communicate the state data to a computing device 106. The computing device 106 can authorize the interactive object based at least in part on the state data.

Figure 14:
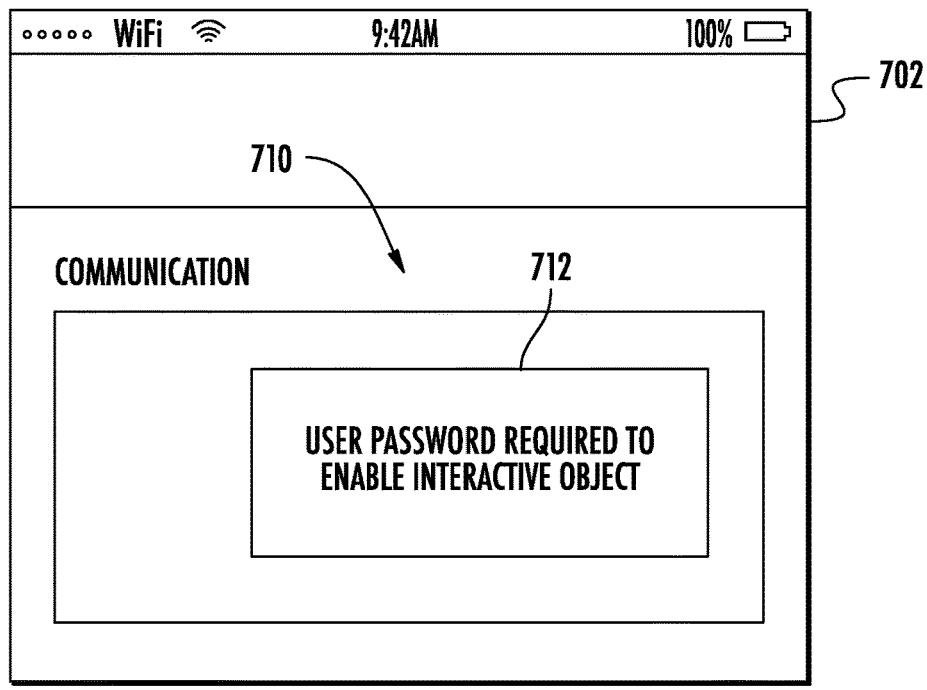
FIG. 14 illustrates an example of a graphical user interface associated with an interactive object in accordance with example embodiments of the present disclosure.

FIG. 14 illustrates an example of a computing device 106 including a graphical user interface 710 associated with an interactive object. In the example of FIG. 14, the graphical user interface 710 includes a visual element 712 indicating that a separation of the user from the interactive object has been detected. Specifically, visual element 712 indicates that authentication data is to be provided by the user at the computing device 106 and/or interactive object in order to enable the interactive object to provide control signals that will be acted upon by the computing device 106 in response to inputs provided by a user at the interactive object. It will be appreciated that various user interfaces can be implemented to indicate that a separation has been detected and to optionally prompt a user for authentication data.

FIG. 15 depicts a flowchart describing an example method of managing interactive object input in accordance with example embodiments of the present disclosure. One or more portion(s) of the method 800 can be implemented by one or more computing devices such as, for example, one or more computing devices of computing environment 100, computing environment 190 depicted in FIG. 2, a computing environment 300 depicted in FIG. 11, or a computing system 900 depicted in FIG. 16. One or more portions of method 800 can be implemented as an algorithm on the hardware components of the devices described herein to, for example, utilize sensor data from an interactive object to detect predetermined movements and control the functionality of a computing device remote from the interactive object. In example embodiments, method 800 may be performed by one or more computing devices of an internal electronics module of an interactive object, one or more computing devices of a removable electronics module of an interactive object, and/or one or more computing devices remote from the interactive object.

At (802), a computing device remote from an interactive object is enabled to initiate one or more functions in response to inputs received at the interactive object. The remote computing device can be enabled in response to one or more control messages received from an interactive object. Additionally or alternatively, the remote computing device can be enabled in response to authentication information received from a user via the interactive object and/or the remote computing device. In some instances, the remote computing device can be enabled based at least in part on a previous detection of one or more motions associated with a user attachment to the interactive object.

At (804), movement data associated with a user of an interactive object is generated. The movement can be detected by one or more sensors of the interactive object. The one or more sensors of the interactive object can include one or more inertial measurement units configured to detect inertial input and/or one or more touch sensors configured to detect touch input.

The movement data can include sensor data generated in response to input to the one or more sensors of the interactive object. The sensor data can represent one or more one-dimensional, two-dimensional, and/or three-dimensional motions of the user and/or the interactive object. For example, the interactive object can include one or more inertial measurement units configured to generate inertial data in response to detecting inertial input. In addition, or alternatively, the interactive object can include sensing circuitry configured to generate touch-input data in response to touch input detected at the touch sensor of the interactive object.

At (806), the movement data is analyzed to determine whether it is indicative of one or more predefined motions associated with a separation of a user from the interactive object. For example, a movement manager can analyze the movement data to detect at least one of a plurality of predefined gestures. In some implementations, each of the plurality of pre-defined movements is indicative of a separation of the user from the interactive object. In this manner, a separation of a user from the interactive object can be detected based at least in part on the at least one of the plurality of predefined motions.

At (808), the remote computing device is disabled from initiating one or more functions in response to input received from the interactive object. The remote computing device can be disabled in response to the movement data being indicative of the one or more predefined motions associated with the user separation. In some examples, a movement manager may transmit one or more control signals to the remote computing device indicative of the user separation. The remote computing device, such as by an operating system or other system of the computing device, and disable the computing device from initiating the one or more functions in response to input from the interactive object.

In some examples, state data indicative of a state of an interactive object relative to the user device can be generated. For example, state data indicative of a state of the interactive object relative to the remote computing device can be generated in response to detecting the separation of the user from the interactive object. For example, a non-trusted state of the interactive object relative to the user device can be generated in response to detecting a separation of a user from the interactive object. The user device can be configured, based on the state data indicative of the non-trusted state, not to perform one or more functions in response to input from the interactive object.

Figure 16:
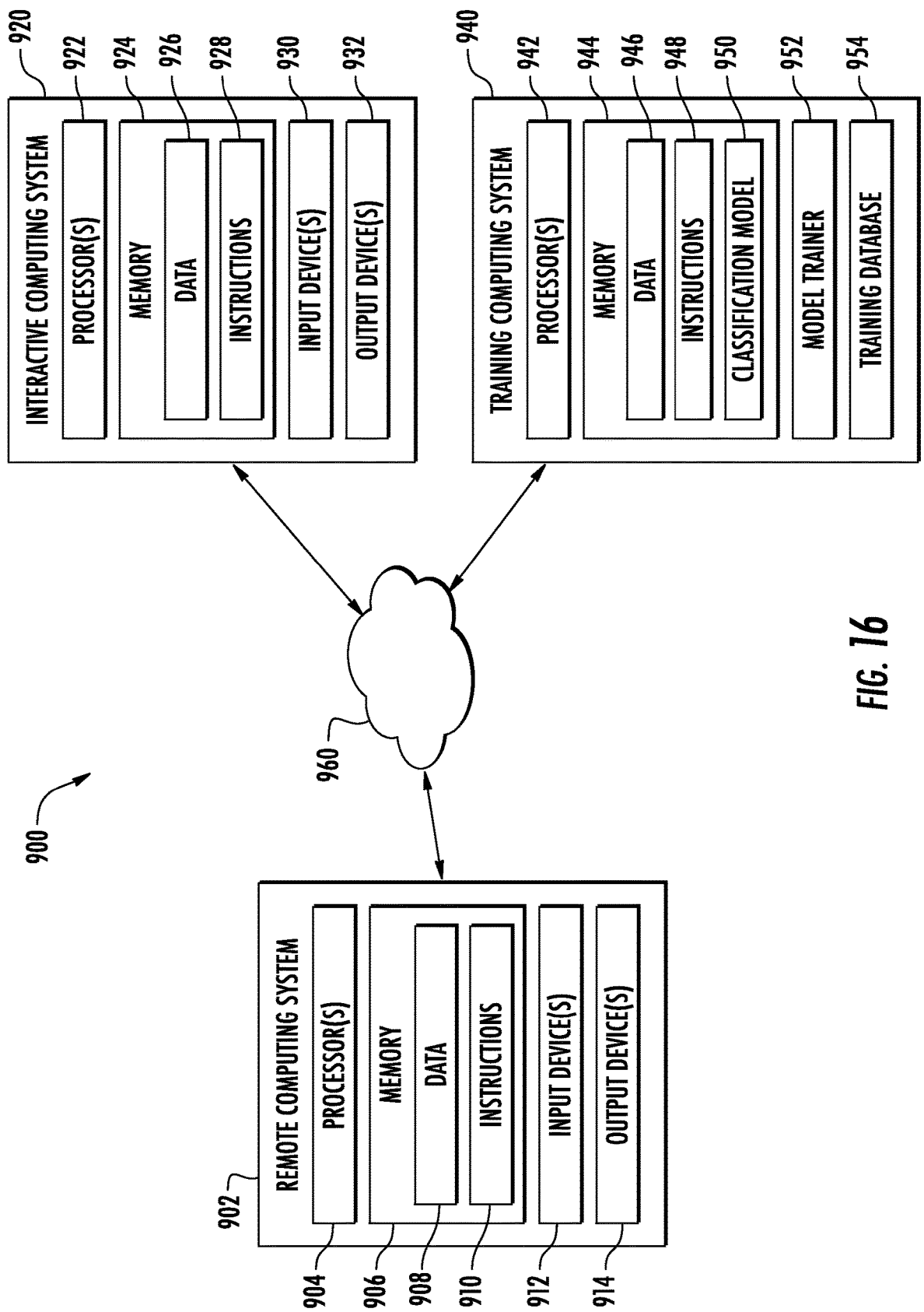
FIG. 16 depicts a block diagram of an example computing system that can be used to implement example embodiments in accordance with the present disclosure.

FIG. 16 depicts a block diagram of an example computing environment 900 that can be used to implement any type of computing device as described herein. The system environment includes a remote computing system 902, an interactive computing system 920, and a training computing system 940 that are communicatively coupled over a network 960. The interactive computing system 920 can be used to implement an interactive object in some examples.

The remote computing system 902 can include any type of computing device, such as, for example, a personal computing device (e.g., laptop or desktop), a mobile computing device (e.g., smartphone or tablet), a gaming console or controller, an embedded computing device, a server computing device, or any other type of computing device.

The remote computing system 902 includes one or more processors 904 and a memory 906. The one or more processors 904 can be any suitable processing device (e.g., a processor core, a microprocessor, an ASIC, a FPGA, a controller, a microcontroller, etc.) and can be one processor or a plurality of processors that are operatively connected. The memory 906 can include one or more non-transitory computer-readable storage mediums, such as RAM, ROM, EEPROM, EPROM, flash memory devices, magnetic disks, etc., and combinations thereof. The memory 906 can store data 908 and instructions 910 which are executed by the processor 904 to cause the remote computing system 902 to perform operations.

The remote computing system 902 can also include one or more input devices 912 that can be configured to receive user input. By way of example, the one or more input devices 912 can include one or more soft buttons, hard buttons, microphones, scanners, cameras, etc. configured to receive data from a user of the remote computing system 902. For example, the one or more input devices 912 can serve to implement a virtual keyboard and/or a virtual number pad. Other example user input devices 912 include a microphone, a traditional keyboard, or other means by which a user can provide user input.

The remote computing system 902 can also include one or more output devices 914 that can be configured to provide data to one or more users. By way of example, the one or more output device(s) 914 can include a user interface configured to display data to a user of the remote computing system 902. Other example output device(s) 914 include one or more visual, tactile, and/or audio devices configured to provide information to a user of the remote computing system 902.

The interactive computing system 9'20 can be used to implement any type of interactive object such as, for example, a wearable computing device. The interactive computing system 920 includes one or more processors 922 and a memory 924. The one or more processors 922 can be any suitable processing device (e.g., a processor core, a microprocessor, an ASIC, a FPGA, a controller, a microcontroller, etc.) and can be one processor or a plurality of processors that are operatively connected. The memory 924 can include one or more non-transitory computer-readable storage mediums, such as RAM, ROM, EEPROM, EPROM, flash memory devices, magnetic disks, etc., and combinations thereof. The memory 924 can store data 926 and instructions 928 which are executed by the processor 922 to cause the interactive computing system 920 to perform operations.

The interactive computing system 920 can also include one or more input devices 930 that can be configured to receive user input. For example, the user input device 930 can be a touch-sensitive component (e.g., a touch sensor 102) that is sensitive to the touch of a user input object (e.g., a finger or a stylus). As another example, the user input device 930 can be an inertial component (e.g., inertial measurement unit 158) that is sensitive to the movement of a user. Other example user input components include a microphone, a traditional keyboard, or other means by which a user can provide user input. The interactive computing system 920 can also include one or more output devices 932 configured to provide data to a user. For example, the one or more output devices 932 can include one or more visual, tactile, and/or audio devices configured to provide the information to a user of the interactive computing system 920.

The training computing system 940 includes one or more processors 942 and a memory 944. The one or more processors 942 can be any suitable processing device (e.g., a processor core, a microprocessor, an ASIC, a FPGA, a controller, a microcontroller, etc.) and can be one processor or a plurality of processors that are operatively connected. The memory 944 can include one or more non-transitory computer-readable storage mediums, such as RAM, ROM, EEPROM, EPROM, flash memory devices, magnetic disks, etc., and combinations thereof. The memory 944 can store data 946 and instructions 948 which are executed by the processor 942 to cause the training computing system 940 to perform operations. In some implementations, the training computing system 940 includes or is otherwise implemented by one or more server computing devices.

The training computing system 940 can include a model trainer 952 that trains a machine-learned classification model 950 using various training or learning techniques, such as, for example, backwards propagation of errors. In other examples as described herein, training computing system 940 can train machine-learned classification model 950 using training data 954. For example, the training data 954 can include labeled sensor data generated by interactive computing system 920. The training computing system 940 can receive the training data 954 from the interactive computing system 920, via network 960, and store the training data 954 at training computing system 940. The machine-learned classification model 950 can be stored at training computing system 940 for training and then deployed to remote computing system 902 and/or the interactive computing system 920. In some implementations, performing backwards propagation of errors can include performing truncated backpropagation through time. The model trainer 952 can perform a number of generalization techniques (e.g., weight decays, dropouts, etc.) to improve the generalization capability of the classification model 950.

In particular, the training data 954 can include a plurality of instances of sensor data, where each instance of sensor data has been labeled with ground truth inferences such as one or more predefined movement recognitions. For example, the label(s) for each instance of sensor data can describe the position and/or movement (e.g., velocity or acceleration) of an object movement. In some implementations, the labels can be manually applied to the training data by humans. In some implementations, the machine-learned classification model 950 can be trained using a loss function that measures a difference between a predicted inference and a ground-truth inference.

The model trainer 952 includes computer logic utilized to provide desired functionality. The model trainer 952 can be implemented in hardware, firmware, and/or software controlling a general purpose processor. For example, in some implementations, the model trainer 952 includes program files stored on a storage device, loaded into a memory and executed by one or more processors. In other implementations, the model trainer 952 includes one or more sets of computer-executable instructions that are stored in a tangible computer-readable storage medium such as RAM hard disk or optical or magnetic media.

In some examples, a training database 956 can be stored in memory on an interactive object, removable electronics module, user device, and/or a remote computing device. For example, in some embodiments, a training database 956 can be stored on one or more remote computing devices such as one or more remote servers. The machine-learned classification model 950 can be trained based on the training data in the training database 956. For example, the machine-learned classification model 950 can be learned using various training or learning techniques, such as, for example, backwards propagation of errors based on the training data from training database 956.

In this manner, the machine-learned classification model 950 can be trained to determine at least one of a plurality of predefined movement(s) associated with the interactive object based on movement data.

The machine-learned classification model 950 can be trained, via one or more machine learning techniques using training data. For example, the training data can include movement data previously collected by one or more interactive objects. By way of example, one or more interactive objects can generate sensor data based on one or more movements associated with the one or more interactive objects. The previously generated sensor data can be labeled to identify at least one predefined movement associated with the touch and/or the inertial input corresponding to the sensor data. The resulting training data can be collected and stored in a training database 956.

The network 960 can be any type of communications network, such as a local area network (e.g., intranet), wide area network (e.g., Internet), or some combination thereof and can include any number of wired or wireless links. In general, communication over the network 960 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 16 illustrates one example computing system that can be used to implement the present disclosure. Other computing systems can be used as well. For example, in some implementations, the remote computing system 902 can include the model trainer 952 and the training data 954. In such implementations, the classification model 950 can be trained and used locally at the remote computing system 902. In some of such implementations, the remote computing system 902 can implement the model trainer 952 to personalize the classification model 950 based on user-specific movements.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of managing interactive object input, the method comprising:
    enabling, by one or more processors, a computing device to initiate one or more functions in response to input received from an interactive object that is remote from the computing device;
    obtaining, by the one or more processors, movement data indicative of movement associated with a user of the interactive object, wherein the movement is detected by a touch sensor of the interactive object, the touch sensor including a plurality of sensing lines, the touch sensor having a first surface configured to detect touch input provided by the user of the interactive object to the plurality of sensing lines, the touch sensor having a second, opposite surface capable of detecting touch input to the plurality of sensing lines, wherein the movement data is associated with the touch input at the second, opposite surface of the touch sensor;
    determining, by the one or more processors, that the movement data is indicative of one or more predefined motions associated with a separation of the user from the interactive object; and
    in response to the movement data being indicative of the one or more predefined motions, disabling, by the one or more processors, the computing device from initiating the one or more functions in response to input received from the interactive object.

2. The computer-implemented method of claim 1, wherein:
    the plurality of sensing lines are integrated with the interactive object.

3. The computer-implemented method of claim 1, wherein:
    the interactive object is an interactive garment; and
    the movement data includes touch data indicative of movement of at least one body part of the user of the interactive object relative to the second surface.

4. The computer-implemented method of claim 3, wherein:
    the interactive garment includes a first portion comprising the touch sensor;
    the one or more predefined motions are associated with removal of the interactive garment from the user of the interactive garment; and
    determining, by the one or more processors, that the movement data is indicative of the one or more predefined motions comprises determining that the movement data is indicative of the first portion of the interactive object moving relative to the at least one body part of the user.

5. The computer-implemented method of claim 1, wherein:
    the one or more predefined motions include at least one predefined motion comprising a first detected movement followed by a minimum period of non-detected movement.

6. The computer-implemented method of claim 1, wherein:
    the interactive object includes an inertial measurement unit; and
    determining, by the one or more processors, that the movement data is indicative of the one or more predefined motions comprises determining that movement data associated with the touch sensor and movement data associated with the inertial measurement unit are both indicative of the one or more predefined motions.

7. The computer-implemented method of claim 1, wherein determining, by the one or more processors, that the movement data is indicative of the one or more predefined motions associated with separation of the user from the interactive object comprises:
    inputting, by the one or more processors, the movement data into a machine-learned classification model configured to generate classification data indicating whether the movement data is indicative of the one or more predefined motions.

8. The computer-implemented method of claim 7, wherein the machine-learned classification model includes a binary classifier trained to provide an indication that a plurality of predefined motions including the one or more predefined motions are indicative of a user separation from an interactive object.

9. The computer-implemented method of claim 7, wherein the machine-learned classification model includes a plurality of classifiers each trained to identify a different one of a plurality of predefined motions including the one or more predefined motions.

10. The computer-implemented method of claim 1, further comprising:
    generating, by the one or more processors, state data indicative of a non-trusted state of the interactive object relative to the computing device in response to the movement data being indicative of the one or more predefined motions.

11. The computer-implemented method of claim 1, wherein enabling, by the one or more processors, the computing device to initiate one or more functions in response to input received from the interactive object comprises:
    generating, by the one or more processors, state data indicative of a trusted state of the interactive object relative to the computing device.

12. The computer-implemented method of claim 11, further comprising:
receiving, by the one or more processors, authentication data associated with a user of the computing device;
wherein generating, by the one or more processors, the state data indicative of the trusted state of the interactive object relative to the computing device is based at least in part on the authentication data.

13. The computer-implemented method of claim 1, wherein:
determining, by the one or more processors, that the movement data is indicative of one or more predefined motions comprises determining, by at least one processor at the interactive object, that the movement data is indicative of the one or more predefined motions; and
disabling, by the one or more processors, the computing device from initiating the one or more functions comprises transmitting, from the interactive object to the computing device, data indicative of the separation of the user from the interactive object.

14. The computer-implemented method of claim 1, wherein:
determining, by the one or more processors, that the movement data is indicative of one or more predefined motions comprises determining, by at least one processor at the computing device, that the movement data is indicative of the one or more predefined motions; and
disabling, by the one or more processors, the computing device from initiating the one or more functions comprises storing at the computing device state data indicative of the separation of the user from the interactive object.

15. The computer-implemented method claim 1, wherein:
the computing device comprises a smartphone carried by the user;
the interactive object comprises a wearable garment that when not separated is worn by the user and when separated has been taken off by the user;
said disabling the computing device from initiating the one or more functions comprises preventing sensor-sensed inputs from causing the smartphone to perform any function responsive thereto, but keeps the wearable garment otherwise authenticated to the smartphone.

16. The computer-implemented method of claim 1, wherein:
the computing device comprises a smartphone carried by the user;
the interactive object comprises a wearable garment that when not separated is worn by the user and when separated has been taken off by the user;
said disabling the computing device from initiating the one or more functions comprises preventing sensor-sensed inputs from causing the smartphone to perform any function responsive thereto and causes the wearable garment to be de-authenticated to the smartphone.

17. An interactive object, comprising:
a touch sensor configured to detect movement associated with a user of the interactive object, the touch sensor including a plurality of sensing lines, the touch sensor having a first surface configured to detect touch input provided by the user of the interactive object to the plurality of sensing lines and a second, opposite surface capable of detecting touch input to the plurality of sensing lines;
one or more processors communicatively coupled to the touch sensor, the one or more processors configured to:
obtain movement data indicative of movement associated with a user of the interactive object, wherein the movement is detected by the touch sensor, wherein the movement data is associated with the touch input to the plurality of sensing lines at the second, opposite surface of the touch sensor;
determine that the movement data is indicative of one or more predefined motions associated with a separation of the user from the interactive object; and
transmit, to the computing device, data indicative of the separation of the user from the interactive object.

18. A computing system, comprising:
one or more processors; and
one or more non-transitory, computer-readable media that store instructions that when executed by the one or more processors cause the computing system to perform operations, the operations comprising:
enabling a first computing device to initiate one or more functions in response to input received from an interactive object that is remote from the first computing device;
receiving, from the interactive object, data indicative of a user separation from the interactive object, wherein the data indicative of the user separation is based at least in part on movement of a user of the interactive object, wherein the movement is detected by a touch sensor of the interactive object, the touch sensor including a plurality of sensing lines integrated with the interactive object, the touch sensor having a first surface configured to detect touch input provided by the user of the interactive object to the plurality of sensing lines, the touch sensor having a second, opposite surface capable of detecting touch input to the plurality of sensing lines, wherein the data indicative of the user separation is associated with the touch input to the plurality of sensing lines at the second, opposite surface of the touch sensor; and
disabling, in response to the data indicative of the user separation, the first computing device from initiating one or more functions in response to input received from the interactive object.

* * * * *